US010285183B2

(12) United States Patent
Huang et al.

(10) Patent No.: US 10,285,183 B2
(45) Date of Patent: May 7, 2019

(54) SIGNAL PROCESSING METHOD, APPARATUS, AND SYSTEM FOR PROVIDING SERVICE TO MULTIPLE USER EQUIPMENTS AT A SAME TIME AND IN A SAME FREQUENCY

(71) Applicant: HUAWEI TECHNOLOGIES CO., LTD., Shenzhen (CN)

(72) Inventors: Tao Huang, Beijing (CN); An Wei, Shenzhen (CN); Linjun Lv, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 182 days.

(21) Appl. No.: 15/337,725

(22) Filed: Oct. 28, 2016

(65) Prior Publication Data

US 2017/0048874 A1 Feb. 16, 2017

Related U.S. Application Data

(63) Continuation of application No. PCT/CN2014/088715, filed on Oct. 16, 2014.

(30) Foreign Application Priority Data

Apr. 30, 2014 (CN) .......................... 2014 1 0181479

(51) Int. Cl.
*H04W 72/08* (2009.01)
*H04W 24/08* (2009.01)
(Continued)

(52) U.S. Cl.
CPC .......... *H04W 72/082* (2013.01); *H04B 7/024* (2013.01); *H04B 7/0452* (2013.01);
(Continued)

(58) Field of Classification Search
CPC . H04W 72/082; H04W 72/085; H04W 72/12; H04W 72/1226; H04W 24/08;
(Continued)

(56) References Cited

U.S. PATENT DOCUMENTS 7,248,841 B2 *  7/2007  Agee ................... H04B 7/0417
                                                   455/101
9,214,995 B2 * 12/2015  Bayesteh ............. H04B 7/0413
(Continued)

FOREIGN PATENT DOCUMENTS

CN       101958735        1/2011
CN       102594420        7/2012
(Continued)

OTHER PUBLICATIONS

Madan et al., Cell Association and Interference Coordination in Heterogeneous LTE-A Cellular Networks, IEEE Journal on Selected Areas in Communications, vol. 28, No. 9, Dec. 2010.*
(Continued)

*Primary Examiner* — Hassan A Phillips
*Assistant Examiner* — Manuel A. Ortiz Diaz
(74) *Attorney, Agent, or Firm* — Staas & Halsey LLP

(57) ABSTRACT

The present invention discloses a signal processing method, apparatus, and system. In M user equipments, an active set $K_i$ and an interference set $K'_i$ of a user equipment i are determined according to power measurement values from the user equipment i to N sites; for the active set $K_i$ of the user equipment i, superposition of sent signals of all other user equipments j of all active sites $k_i$ are cancelled out with each other, to obtain one constraint condition of a weight, and for the M user equipments, M constraint conditions are obtained, and a weight subspace T is determined; and one weight is determined in the weight subspace according to an interfering signal of another user equipment j for the user
(Continued)

equipment i in the interference set $K'_i$ of the user equipment i and a wanted signal of the user equipment i in the active set $K_i$ of the user equipment i.

16 Claims, 7 Drawing Sheets

(51) Int. Cl.
    *H04W 72/12*     (2009.01)
    *H04B 7/024*     (2017.01)
    *H04B 7/0452*     (2017.01)
    *H04J 11/00*     (2006.01)

(52) U.S. Cl.
    CPC ......... *H04J 11/003* (2013.01); *H04J 11/0053* (2013.01); *H04W 24/08* (2013.01); *H04W 72/12* (2013.01)

(58) Field of Classification Search
    CPC ............. H04W 28/0236; H04W 28/16; H04W 52/0229; H04W 52/0238; H04W 52/245; H04W 52/241; H04W 52/243; H04W 52/244
    See application file for complete search history.

(56) References Cited

U.S. PATENT DOCUMENTS

| | | | |
|---|---|---|---|
| 2008/0075058 A1* | 3/2008 | Mundarath | H04B 7/043 370/342 |
| 2009/0080384 A1* | 3/2009 | Leung | H04W 72/082 370/336 |
| 2010/0238827 A1* | 9/2010 | Borran | H04W 48/20 370/252 |
| 2011/0086654 A1 | 4/2011 | Larsson | |
| 2011/0177834 A1* | 7/2011 | Shin | H04J 11/0033 455/501 |
| 2012/0114062 A1 | 5/2012 | Zhang et al. | |
| 2012/0307672 A1 | 12/2012 | Liu et al. | |
| 2013/0267266 A1* | 10/2013 | Park | H04B 7/0456 455/501 |
| 2013/0273950 A1 | 10/2013 | Sun et al. | |
| 2013/0315156 A1* | 11/2013 | Xiao | H04B 7/024 370/329 |
| 2014/0146756 A1* | 5/2014 | Sahin | H04L 1/0025 370/329 |
| 2014/0283219 A1* | 9/2014 | Yuan | C12P 7/625 800/298 |

FOREIGN PATENT DOCUMENTS

| | | |
|---|---|---|
| CN | 103391552 | 11/2013 |
| EP | 2437419 | 4/2012 |
| JP | 2013-24354 | 12/2013 |
| JP | 2013243454 | 12/2013 |
| KR | 20100068466 A | 6/2010 |
| KR | 20130129973 A | 11/2013 |

OTHER PUBLICATIONS

3GPP, R1-091903, Adaptive Cell Clustering for CoMP in LTE-A, May 2009.*
International Search Report dated Feb. 4, 2015 in corresponding International Application No. PCT/CN2014/088715.
Extended European Search Report dated Jul. 18, 2017 in corresponding European Patent Application No. 14890679.5.
Mohammad Ali Maddah-Ali et al.: "Signaling over MIMO Multi-Base Systems: Combination of Multi-Access and Broadcast Schemes," Information Theory, 2006 IEEE International Symposium on, IEEE, Jul. 1, 2006, pp. 2104-2108, XP031032587.
Huawei; "Downlink CoMP categories and feedback analysis," 3GPP TSG RAN WG1 Meeting #56bis, R1-091264, Seoul Korea, Mar. 23-27, 2009.
ETRI: "UE Feedback for downlink CoMP," 3GPP TSG RAN WG1 Meeting #58bis, Miyazaki, Japan, Oct. 12-16, 2009.
Japanese Notice of Allowance dated Oct. 31, 2017 in corresponding Japanese Patent Application No. 2016-565485.
International Search Report, dated Feb. 4, 2015, in International Application No. PCT/CN2014/088715 (4 pp.).
Korean Office Action for Korean Patent Application No. 10-2016-7033622 dated Jun. 30, 2018.

* cited by examiner

SIGNAL PROCESSING METHOD, APPARATUS, AND SYSTEM FOR PROVIDING SERVICE TO MULTIPLE USER EQUIPMENTS AT A SAME TIME AND IN A SAME FREQUENCY

CROSS-REFERENCE TO RELATED APPLICATION

This application is a continuation of International Application No. PCT/CN2014/088715, filed on Oct. 16, 2014, which claims priority to Chinese Patent Application No. 201410181479.3, filed on Apr. 30, 2014, The disclosures of the aforementioned applications are hereby incorporated by reference in their entireties.

TECHNICAL FIELD

Embodiments of the present invention relate to the field of communications technologies, and in particular, to a signal processing method, apparatus, and system.

BACKGROUND

In a communications system in high density radio coverage, all wireless sites have very large overlaps between coverage areas, and accordingly there are no cell edges; therefore, signals between all the sites and a user equipment are very good.

However, just because the signals between all the sites and the user equipment are very good, when a site provides a service for multiple user equipments at the same time in a same frequency, it is easily caused that when the site sends signals to the multiple user equipments at the same time in a same frequency, signal interference between the multiple user equipments is caused, reducing service quality of a user equipment.

SUMMARY

Embodiments of the present invention provide a signal processing method, apparatus, and system, which are used to solve a problem in the prior art that when a site sends signals to multiple user equipments at the same time in a same frequency, signal interference between the multiple user equipments is caused, and can improve service quality of a user equipment.

According to a first aspect, a signal processing method is provided, including:

determining, in M user equipments, an active set $K_i$ and an interference set $K'_i$ of a user equipment i according to power measurement values from the user equipment i to N sites, where the active set $K_i$ of the user equipment i includes an identifier $k_i$ of an active site that provides a wanted signal for the user equipment i, the interference set $K'_i$ of the user equipment i includes an identifier $k'_i$ of an interfering site that provides an interfering signal for the user equipment, $k_i \in K_i$, $k'_i \in K'_i$, i=1, 2, ... M, M is an integer greater than or equal to 1, and N is an integer greater than or equal to 1;

for the active set $K_i$ of the user equipment i, making superposition of sent signals of all other user equipments j of all active sites $k_i$ cancelled out with each other, to obtain one constraint condition of a weight, and for the M user equipments, obtaining M constraint conditions, and determining a weight subspace T, where the weight subspace includes M weights, j represents another user equipment in the M user equipments except the user equipment i, and j=1, 2, ... M; j≠i; and determining one weight in the weight subspace according to an interfering signal of another user equipment j for the user equipment i in the interference set $K'_i$ of the user equipment i and a wanted signal of the user equipment i in the active set $K_i$ of the user equipment i, so that any active site in an active set of each user equipment determines one weighted value, and uses the weighted value as a weight that a corresponding active site uses for sending a signal to the M user equipments.

Based on the first aspect, in a first implementation manner, the determining, in M user equipments, an active set $K_i$ and an interference set $K'_i$ of a user equipment i according to power measurement values from the user equipment i to N sites includes:

in the M user equipments, according to the power measurement values from the user equipment i to the N sites, if a power measurement value from the user equipment i to a site k is greater than or equal to a preset activation threshold value, determining the site k as an active site $k_i$ of the user equipment i, and adding the site k to the active set $K_i$ of the user equipment i, where k=1, 2, ..., N and $k_i$=1, 2, ..., N; or if a power measurement value from the user equipment i to a site k is less than a preset activation threshold value, and greater than or equal to a preset interference threshold value, determining the site k as an interfering site $k'_i$ of the user equipment i, and adding the site k to the interference set $K'_i$ of the user equipment i.

Based on the first aspect or the first implementation manner of the first aspect, in a second implementation manner, the constraint condition of the weight obtained by: for the active set $K_i$ of the user equipment i, making the superposition of the sent signals of all the other user equipments j of all the active sites $k_i$ cancelled out with each other is:

$$\text{s.t.} \sum_{j \neq i, k_i} \overset{r}{h}_{i,k_i} A_{j,k_i} P_{j,k_i} \overset{r}{w}_{j,k_i} A_{i,k_i} = 0,$$

where i=1, 2, ... M and j=1, 2, ... M; j≠i, i is an identifier of the user equipment i, and $k_i$ is an identifier of an active site in the active set of the user equipment i;

$\overset{r}{h}_{i,k_i}$ is a channel measurement value from the user equipment i to the active site $k_i$;

$A_{j,k_i}$ is equal to 1 or 0, where when the active site $k_i$ of the user equipment i is an active site of another user equipment j, $A_{j,k_i}$ is equal to 1, and when the active site $k_i$ of the user equipment i is not an active site of another user equipment j, $A_{j,k_i}$ is equal to 0;

$P_{j,k_i}$ is a power measurement value from the user equipment j to the active site of $k_i$ of the user equipment i;

$A_{i,k_i}$ is equal to 1 or 0, where when the site $k_i$ is an active site of the user equipment i, $A_{i,k_i}$ is equal to 1, and when the site k is not an active site of the user equipment i, $A_{i,k_i}$ is equal to 0; and $\overset{r}{w}_{j,k_j}$ is a weight used by the active site $k_j$ of the user equipment i when sending a signal to the another user equipment j.

Based on the second implementation manner of the first aspect, in a third implementation manner, the determining one weight in the weight subspace according to an interfering signal of another user equipment j for the user equipment i in the interference set K'$_i$ of the user equipment i and a wanted signal of the user equipment i in the active set K$_i$ of the user equipment i includes:

calculating the interfering signal of the another user equipment j for the user equipment i in the interference set K'$_i$ of the user equipment i:

$$I_i = \sum_{j \neq i, k'_i} \overset{r}{h}_{i,k'_i} A_{j,k'_i} P_{j,k'_i} \overset{r}{w}_{j,k'_i} I_{i,k'_i},$$

where k'$_i$∈K'$_i$;

calculating the wanted signal of the user equipment i in the active set of the user equipment i:

$$S_i = \sum_{k_i} A_{i,k_i} P_{i,k_i} \overset{r}{h}_{i,k_i} \overset{r}{w}_{i,k_i},$$

where k$_i$∈K$_i$; and determining target values of M maximum weights according to argmax$\|S_i\|^2/(\|I_i\|^2+N_i)$, calculating an average value of the target values of the M maximum weights, and using the average value as a weighted value used by the active site $k_i$, where $N_i$ is noise corresponding to the user equipment i.

Based on the second implementation manner of the first aspect, in a fourth implementation manner, the determining one weight in the weight subspace according to an interfering signal of another user equipment j for the user equipment i in the interference set K'$_i$ of the user equipment i and a wanted signal of the user equipment i in the active set K$_i$ of the user equipment i includes:

calculating a power of the interfering signal of the another user equipment j for the user equipment i in the interference set K'$_i$ of the user equipment i:

$$\Delta_i = \|I_i\|^2 = \left\|\sum_{j \neq i, k'_i} \overset{r}{h}_{i,k'_i} A_{j,k'_i} P_{j,k'_i} \overset{r}{w}_{j,k'_i} I_{i,k'_i}\right\|^2,$$

where k'$_i$∈K'$_i$;

calculating a power of the wanted signal of the user equipment i in the active set of the user equipment i:

$$\Gamma_i = \|S_i\|^2 = \left\|\sum_{k_i} P_{i,k_i} \overset{r}{h}_{i,k_i} \overset{r}{w}_{i,k_i}\right\|^2,$$

where k$_i$∈K$_i$; and in the weight subspace of the active site $k_i$, using weights corresponding to a minimum value of $\Delta_i$ and a maximum value of $\Gamma_i$ as weighted values used by the active site $k_i$.

Based on the second implementation manner of the first aspect, in a fifth implementation manner, the determining one weight in the weight subspace according to an interfering signal of another user equipment j for the user equipment i in the interference set K'$_i$ of the user equipment i and a wanted signal of the user equipment i in the active set K$_i$ of the user equipment i includes:

calculating a power of the interfering signal of the another user equipment j for the user equipment i in the interference set K'$_i$ of the user equipment i:

$$\Delta_i = \|I_i\|^2 = \left\|\sum_{j \neq i, k'_i} \overset{r}{h}_{i,k'_i} A_{j,k'_i} P_{j,k'_i} \overset{r}{w}_{j,k'_i} I_{i,k'_i}\right\|^2,$$

where k'$_i$∈K'$_i$;

calculating a power of the wanted signal of the user equipment i in the active set of the user equipment i:

$$\Gamma_i = \|S_i\|^2 = \left\|\sum_{k_i} P_{i,k_i} \overset{r}{h}_{i,k_i} \overset{r}{w}_{i,k_i}\right\|^2,$$

where k$_i$∈K$_i$; and in the weight subspace, excluding one or more mutually orthogonal directions from a direction in which the power $\Delta_i$ of the interfering signal of the user equipment i increases, excluding one or more mutually orthogonal directions from a direction $\Gamma_i$ which the power of the wanted signal of the user equipment i decreases, and using a weight corresponding to a final remaining direction as a weighted value used by the active site $k_i$.

Based on the first implementation manner of the first aspect, in a sixth implementation manner:

adaptive adjustment is performed on the activation threshold value according to an activation threshold corresponding to a nominal power, based on an adjustment amount of a site transmit power, based on an adjustment amount of a user demodulation capability, based on an adjustment amount of a base station demodulation capability, and/or based on an adjustment amount of a bearer system; and adaptive adjustment is performed on the interference threshold value according to an interference threshold corresponding to the nominal power, based on the adjustment amount of the site transmit power, based on the adjustment amount of the user demodulation capability, based on the adjustment amount of the base station demodulation capability, and/or based on the adjustment amount of the bearer system.

Based on the first aspect, in a seventh implementation manner, after the determining one weighted value in a weight list of each active site in the active set of the user equipment i, and uses the weighted value as a weight that a corresponding active site uses for sending a signal to the M user equipments, the method includes:

sending the determined weighted value to the corresponding active site, so that the corresponding active site sends a signal to the M user equipments at the same time in a same frequency by using the determined weighted value.

According to a second aspect, a signal processing apparatus is provided, including:

a first determining module, configured to: in M user equipments, determine an active set K$_i$ and an interference set K'$_i$ of a user equipment i according to power measurement values from the user equipment i to N sites, where the active set $K_i$ of the user equipment i includes an identifier $k_i$ of an active site that provides a wanted signal for the user equipment i, the interference set $K'_i$ of the user equipment i includes an identifier $k'_i$ of an interfering site that provides an interfering signal for the user equipment, $k_i \in K_i$, $k'_i \in K'_i$, i=1, 2, . . . M, M is an integer greater than or equal to 1, and N is an integer greater than or equal to 1;

a second determining module, configured to: on the basis of the active set and the interference set that are determined by the first determining module, for the active set $K_i$ of the user equipment i, make superposition of sent signals of all other user equipments j of all active sites $k_i$ cancelled out with each other, to obtain one constraint condition of a weight, and for the M user equipments, obtain M constraint conditions, and determine a weight subspace T, where the weight subspace includes M weights, j represents another user equipment in the M user equipments except the user equipment i, and j=1, 2, . . . M; j≠i; and a third determining module, configured to: on the basis of the weight subspace determined by the second determining module, determine one weight in the weight subspace according to an interfering signal of another user equipment j for the user equipment i in the interference set $K'_i$ of the user equipment i and a wanted signal of the user equipment i in the active set $K_i$ of the user equipment i, so that any active site in an active set of each user equipment determines one weighted value, and uses the weighted value as a weight that a corresponding active site uses for sending a signal to the M user equipments.

Based on the second aspect, in a first implementation manner, the first determining module is specifically configured to:

in the M user equipments, according to the power measurement values from the user equipment i to the N sites, if a power measurement value from the user equipment i to a site k is greater than or equal to a preset activation threshold value, determine the site k as an active site $k_i$ of the user equipment i, and add the site k to the active set $K_i$ of the user equipment i, where $k_i$=1, 2, . . . , N and $k_i$=1, 2, . . . , N; or if a power measurement value from the user equipment i to a site k is less than a preset activation threshold value, and greater than or equal to a preset interference threshold value, determine the site k as an interfering site $k'_i$ of the user equipment i, and add the site k to the interference set $K'_i$ of the user equipment i.

Based on the second aspect or the first implementation manner of the second aspect, in a second implementation manner, the constraint condition of the weight obtained by the second determining module is:

$$\text{s.t.} \sum_{j \neq i, k_i} \vec{h}_{i,k_i} A_{j,k_i} P_{j,k_i} \vec{w}_{j,k_i} A_{i,k_i} = 0,$$

where i=1, 2, . . . M; and j≠i, i is an identifier of the user equipment i, and $k_i$ is an identifier of an active site in the active set of the user equipment i;

$$\vec{h}_{i,k_i}$$

is a channel measurement value from the user equipment i to the active site $k_i$;

$A_{j,k_i}$ is equal to 1 or 0, where when the active site $k_i$ of the user equipment i is an active site of another user equipment j, $A_{j,k_i}$ is equal to 1, and when the active site $k_i$ of the user equipment i is not an active site of another user equipment j, $A_{j,k_i}$ is equal to 0;

$P_{j,k_i}$ is a power measurement value from the user equipment j to the active site $k_i$ of the user equipment i;

$A_{i,k_i}$ is equal to 1 or 0, where when the site k is an active site of the user equipment i, $A_{i,k_i}$ is equal to 1, and when the site k is not an active site of the user equipment i, $A_{i,k_i}$ is equal to 0; and $$\vec{w}_{j,k_i}$$

is a weight used by the active site $k_i$ of the user equipment i when sending a signal to the another user equipment j.

Based on the second implementation manner of the second aspect, in a third implementation manner, the third determining module is specifically configured to:

calculate the interfering signal of the another user equipment j for the user equipment i in the interference set $K'_i$ of the user equipment i:

$$I_i = \sum_{j \neq i, k'_i} \vec{h}_{i,k'_i} A_{j,k'_i} P_{j,k'_i} \vec{w}_{j,k'_i} I_{i,k'_i},$$

where $k'_i \in K'_i$;

calculate the wanted signal of the user equipment i in the active set of the user equipment i:

$$S_i = \sum_{k_i} A_{i,k_i} P_{i,k_i} \vec{h}_{i,k_i} \vec{w}_{i,k_i},$$

where $k_i \in K_i$; and determine target values of M maximum weights according to $\mathrm{argmax} \|S_i\|^2 / (\|I_i\|^2 + N_i)$, calculate an average value of the target values of the M maximum weights, and use the average value as a weighted value used by the active site $k_i$, where $N_i$ is noise corresponding to the user equipment i.

Based on the second implementation manner of the second aspect, in a fourth implementation manner, the third determining module is specifically configured to:

calculate a power of the interfering signal of the another user equipment j for the user equipment i in the interference set $K'_i$ of the user equipment i:

$$\Delta_i = \|I_i\|^2 = \left\| \sum_{j \neq i, k'_i} \vec{h}_{i,k'_i} A_{j,k'_i} P_{j,k'_i} \vec{w}_{j,k'_i} I_{i,k'_i} \right\|^2,$$

where $k'_i \in K'_i$;

calculate a power of the wanted signal of the user equipment i in the active set of the user equipment i:

$$\Gamma_i = \|S_i\|^2 = \left\| \sum_{k_i} P_{i,k_i} \vec{h}_{i,k_i} \vec{w}_{i,k_i} \right\|^2,$$

where $k_i \in K_i$; and in the weight subspace of the active site $k_i$, use weights corresponding to a minimum value of $\Delta_i$ and a maximum value of $\Gamma_i$ as weighted values used by the active site $k_i$.

Based on the second implementation manner of the second aspect, in a fifth implementation manner, the third determining module is specifically configured to:

calculate a power of the interfering signal of the another user equipment j for the user equipment i in the interference set $K'_i$ of the user equipment i:

$$\Delta_i = \|I_i\|^2 = \left\|\sum_{j\neq i, k'_i} \overset{r}{h}_{i,k'_i} A_{j,k'_i} P_{j,k'_i} \overset{r}{w}_{j,k'_i} I_{i,k'_i}\right\|^2,$$

where $k'_i \in K'_i$;

calculate a power of the wanted signal of the user equipment i in the active set of the user equipment i:

$$\Gamma_i = \|S_i\|^2 = \left\|\sum_{k_i} P_{i,k_i} \overset{r}{h}_{i,k_i} \overset{r}{w}_{i,k_i}\right\|^2,$$

where $k_i \in K_i$; and in the weight subspace, exclude one or more mutually orthogonal directions from a direction in which the power $\Delta_i$ of the interfering signal of the user equipment i increases, exclude one or more mutually orthogonal from a direction $\Gamma_i$ which the power of the wanted signal of the user equipment i decreases, and use a weight corresponding to a final remaining direction as a weighted value used by the active site $k_i$.

Based on the second implementation manner of the second aspect, in a sixth implementation manner:

adaptive adjustment is performed on the activation threshold value according to an activation threshold corresponding to a nominal power, based on an adjustment amount of a site transmit power, based on an adjustment amount of a user demodulation capability, based on an adjustment amount of a base station demodulation capability, and/or based on an adjustment amount of a bearer system; and adaptive adjustment is performed on the interference threshold value according to an interference threshold corresponding to the nominal power, based on the adjustment amount of the site transmit power, based on the adjustment amount of the user demodulation capability, based on the adjustment amount of the base station demodulation capability, and/or based on the adjustment amount of the bearer system.

Based on the second aspect, in a seventh implementation manner, the apparatus further includes:

a sending module, configured to send the weighted value determined by the third determining module to the corresponding active site, so that the corresponding active site sends a signal to the M user equipments at the same time in a same frequency by using the determined weighted value.

According to a third aspect, a signal processing system is provided, including: a data center server, N sites, and M user equipments, where M is an integer greater than or equal to 1, and N is an integer greater than or equal to 1;

the data center server is the signal processing apparatus according to the second aspect;

each user equipment in the M user equipments is configured to measure channel measurement values and power measurement values from the user equipment to the N sites, and send, to corresponding sites, the channel measurement values and the power measurement values from the user equipment to the N sites, which are obtained through measurement;

each site in the N sites is configured to detect channel measurement values and power measurement values from the site to the M user equipments; or separately receive channel measurement values and power measurement values from the M user equipments to the site, which are sent by the M user equipments; and each site in the N sites is further configured to send the channel measurement values and the power measurement values from the site to the M user equipments to the data center server, so that the data center server executes the signal processing method according to the first aspect.

Based on the third aspect, in a first implementation manner:

the data center server is further configured to determine user equipment scheduling information corresponding to the sites, and perform grouping of sent signals of the user equipments and waveform synthesis for the sites according to the user equipment scheduling information corresponding to the sites; and the data center server is further configured to perform calculation of user equipment waveforms, weighting of weights, and weighting of the user equipment waveforms according to weighted values corresponding to the sites and obtained by using the signal processing method according to the first aspect.

Based on the third aspect, in a second implementation manner:

the data center server is further configured to send the synthesized site waveforms, the calculated user equipment waveforms, and the weighted values to corresponding sites, so that the sites send signals to the user equipments according to corresponding site waveforms, user equipment waveforms, and weighted values; and the data center server is further configured to perform uplink processing according to the signals sent by the sites, the grouping of the sent signals of the user equipments, and the weighting of the user equipment waveforms.

Based on the third aspect, in a third implementation manner:

each site in the N sites is further configured to: according to weighted values and user scheduling information that are sent by the data center server, perform calculation of user equipment waveforms and weighting of weights, and perform calculation of site waveforms, and send signals to the user equipments according to the site waveforms, the user equipment waveforms, and the weighted values.

In the embodiments of the present invention, in M user equipments, an active set $K_i$ and an interference set $K'_i$ of a user equipment i are determined according to power measurement values from the user equipment i to N sites, where the active set $K_i$ of the user equipment i includes an identifier $k_i$ of an active site that provides a wanted signal for the user equipment i, the interference set $K'_i$ of the user equipment i includes an identifier $k'_i$ of an interfering site that provides an interfering signal for the user equipment, $k_i \in K_i$, $k'_i \in K'_i$, and i=1, 2, ... M for the active set $K_i$ of the user equipment i, superposition of sent signals of all other user equipments j of all active sites $k_i$ are cancelled out with each other, to obtain one constraint condition of a weight, and for the M user equipments, M constraint conditions are obtained, and a weight subspace T is determined, where the weight subspace includes M weights, j represents another user equipment in the M user equipments except the user equipment i, and j=1, 2, ... M; j≠i; and one weight is determined in the weight subspace according to an interfering signal of another user equipment j for the user equipment i in the interference set $K'_i$ of the user equipment i and a wanted signal of the user equipment i in the active set $K_i$ of the user equipment i, so that any active site in an active set of each user equipment determines one weighted value, and uses the weighted value as a weight that a corresponding active site uses for sending a signal to the M user equipments. In this way, the fullest extent of suppression of interference between user equipments in the interference set can be implemented based on zero interference between user equipments in the active set. Therefore, a problem in the prior art that when a site sends signals to multiple user equipments at the same time in a same frequency, signal interference between the multiple user equipments is caused can be solved, thereby improving service quality of a user equipment.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 7-1 is a schematic diagram of a site operating principle in a network system architecture of a data center for highly centralized signal processing according to an embodiment of the present invention; and FIG. 7-2 is a schematic diagram of a data center operating principle in a network system architecture of a data center for highly centralized signal processing according to an embodiment of the present invention.

DESCRIPTION OF EMBODIMENTS

Figure 1:
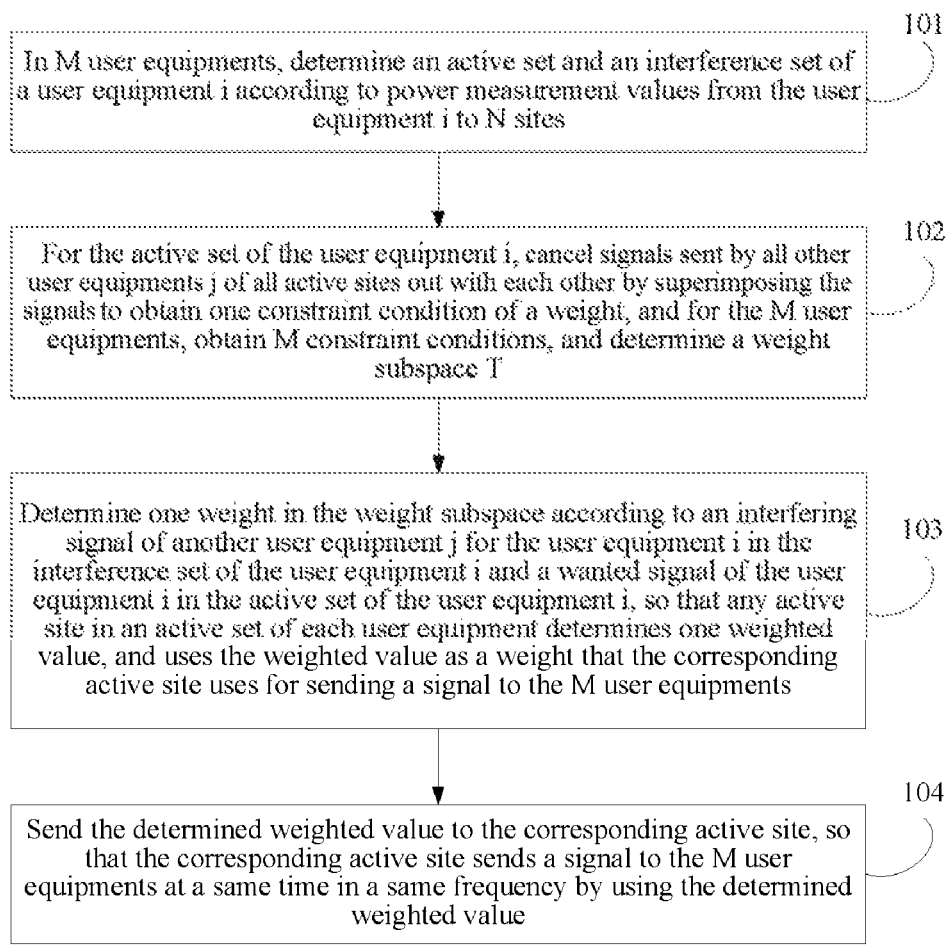
FIG. 1 is a schematic flowchart of a signal processing method according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The technical solutions of the present invention can be applied to various wireless communications systems, for example, a global system for mobile communications (Global System for Mobile Communications, GSM for short), a general packet radio service (General Packet Radio Service, GPRS for short) system, a code division multiple access (Code Division Multiple Access, CDMA for short) system, a CDMA2000 system, a Wideband Code Division Multiple Access (Wideband Code Division Multiple Access, WCDMA for short) system, a Long Term Evolution (Long Term Evolution, LTE for short) system, and a World Interoperability for Microwave Access (World Interoperability for Microwave Access, WiMAX for short) system.

In an existing wireless communications system based on a high density and a high power, an overlap between cells is very large, and therefore two types of sites exist for each user equipment: the first type of sites are those that contribute very high transmit powers; and the second type of sites are those that contribute low or very low transmit powers. For the first type of sites, a channel can be accurately estimated, and therefore a large energy increase can be achieved when a signal is sent to the user equipment, and in addition, when a signal is sent to another user equipment, interference to the user equipment can be suppressed very well. For the second type of sites, due to a channel estimation accuracy and a noise effect, a signal cannot be directly sent to the user equipment, because a problem may occur that the signal cannot be superimposed very well on a signal of another site, and secondly when a signal is sent to another user equipment, interference to this user equipment is comparatively difficult to be suppressed.

Therefore, when a site provides a service for multiple user equipments at the same time in a same frequency, it is easily caused that when the site sends signals to the multiple user equipments at the same time in a same frequency, signal interference between the multiple user equipments is caused, reducing service quality of a user equipment.

To solve the foregoing technical problems, the embodiments of the present invention provide a signal processing method, which can solve a problem in the prior art that when a site sends signals to multiple user equipments at the same time in a same frequency, signal interference between the multiple user equipments is caused, and can improve service quality of a user equipment.

FIG. 1 is a schematic flowchart of a signal processing method according to an embodiment of the present invention. As shown in FIG. 1, the method includes:

101: In M user equipments, determine an active set $K_i$ and an interference set $K'_i$ of a user equipment i according to power measurement values from the user equipment i to N sites.

The active set $K_i$ of the user equipment i includes an identifier $k_i$ of an active site that provides a wanted signal for the user equipment i; and the interference set $K'_i$ of the user equipment i includes an identifier $k'_i$ of an interfering site that provides an interfering signal for the user equipment, where $k_i \in K_i$, $k'_i \in K'_i$, and i=1, 2, . . . M, M is an integer greater than or equal to 1, and N is an integer greater than or equal to 1.

Optionally, in this embodiment, during implementation, step 101 includes:

in the M user equipments, according to the power measurement values from the user equipment i to the N sites, if a power measurement value from the user equipment i to a site k is greater than or equal to a preset activation threshold value, determining the site k as an active site $k_i$ of the user equipment i, and adding the site k to the active set $K_i$ of the user equipment i, where k=1, 2, . . . , N and $k_i$=1, 2, . . . , N; or if a power measurement value from the user equipment i to a site k is less than a preset activation threshold value, and greater than or equal to a preset interference threshold value, determining the site k as an interfering site $k'_i$ of the user equipment i, and adding the site k to the interference set $K'_i$ of the user equipment i.

In this embodiment, adaptive adjustment may be performed on the activation threshold value according to an activation threshold corresponding to a nominal power, based on an adjustment amount of a site transmit power, based on an adjustment amount of a user demodulation capability, based on an adjustment amount of a base station demodulation capability, and/or based on an adjustment amount of a bearer system; and adaptive adjustment is performed on the interference threshold value according to an interference threshold corresponding to the nominal power, based on the adjustment amount of the site transmit power, based on the adjustment amount of the user demodulation capability, based on the adjustment amount of the base station demodulation capability, and/or based on the adjustment amount of the bearer system.

102: For the active set $K_i$ of the user equipment i, make superposition of sent signals of all other user equipments j of all active sites $k_i$ cancelled out with each other, to obtain one constraint condition of a weight, and for the M user equipments, obtain M constraint conditions, and determine a weight subspace T.

The weight subspace includes M weights, j represents another user equipment in the M user equipments except the user equipment i, and j=1, 2, . . . M; j≠i.

Optionally, in this embodiment, the constraint condition of the weight obtained by: for the active set $K_i$ of the user equipment i, making the superposition of the sent signals of all the other user equipments j of all the active sites $k_i$ cancelled out with each other is:

$$\text{s.t.} \sum_{j \neq i, k_i} \vec{h}_{i,k_i} A_{j,k_i} P_{j,k_i} \vec{w}_{j,k_i} A_{i,k_i} = 0,$$

where i=1, 2 . . . M and j=1, 2, . . . M; j≠i, i is an identifier of the user equipment i, and $k_i$ is an identifier of an active site in the active set of the user equipment i;

$$\vec{h}_{i,k_i}$$

is a channel measurement value from the user equipment i to the active site $k_i$;

$A_{j,k_i}$ is equal to 1 or 0, where when the active site $k_i$ of the user equipment i is an active site of another user equipment j, $A_{j,k_i}$ is equal to 1, and when the active site $k_i$ of the user equipment i is not an active site of another user equipment j, $A_{j,k_i}$ is equal to 0;

$P_{j,k_i}$ is a power measurement value from the user equipment j to the active site $k_i$ of the user equipment i;

$A_{i,k_i}$ is equal to 1 or 0, where when the site k is an active site of the user equipment i, $A_{i,k_i}$ is equal to 1, and when the site k is not an active site of the user equipment i, $A_{i,k_i}$ is equal to 0; and $$\vec{w}_{j,k_i}$$

is a weight used by the active site $k_i$ of the user equipment i when sending a signal to the another user equipment j.

103: Determine one weight in the weight subspace according to an interfering signal of another user equipment j for the user equipment i in the interference set $K'_i$ of the user equipment i and a wanted signal of the user equipment i in the active set $K_i$ of the user equipment i, so that any active site in an active set of each user equipment determines one weighted value, and uses the weighted value as a weight that a corresponding active site uses for sending a signal to the M user equipments.

In one optional implementation manner of the present invention, during implementation, step 103 includes:

calculating the interfering signal of the another user equipment j for the user equipment i in the interference set $K'_i$ of the user equipment i:

$$I_i = \sum_{j \neq i, k'_i} \vec{h}_{i,k'_i} A_{j,k'_i} P_{j,k'_i} \vec{w}_{j,k'_i} I_{i,k'_i},$$

where $k'_i \in K'_i$;

calculating the wanted signal of the user equipment i in the active set of the user equipment i:

$$S_i = \sum_{k_i} A_{i,k_i} P_{i,k_i} \vec{h}_{i,k_i} \vec{w}_{i,k_i},$$

where $k_i \in K_i$; and determining target values of M maximum weights according to $\text{argmax}\|S_i\|^2/(\|I_i\|^2 + N_i)$, calculating an average value of the target values of the M maximum weights, and using the average value as a weighted value used by the active site $k_i$, where $N_i$ is noise corresponding to the user equipment i.

In one optional implementation manner of the present invention, during implementation, step 103 includes:

calculating a power of the interfering signal of the another user equipment j for the user equipment i in the interference set $K'_i$ of the user equipment i:

$$\Delta_i = \|I_i\|^2 = \left\| \sum_{j \neq i, k'_i} \vec{h}_{i,k'_i} A_{j,k'_i} P_{j,k'_i} \vec{w}_{j,k'_i} I_{i,k'_i} \right\|^2,$$

where $k' \in K'_i$;

calculating a power of the wanted signal of the user equipment i in the active set of the user equipment i:

$$\Gamma_i = \|S_i\|^2 = \left\| \sum_{k_i} P_{i,k_i} \vec{h}_{i,k_i} \vec{w}_{i,k_i} \right\|^2,$$

where $k_i \in K_i$; and in the weight subspace of the active site $k_i$, using weights corresponding to a minimum value of $\Delta_i$ and a maximum value of $\Gamma_i$ as weighted values used by the active site $k_i$.

In one optional implementation manner of the present invention, during implementation, step 103 includes:

calculating a power of the interfering signal of the another user equipment j for the user equipment i in the interference set K'$_i$ of the user equipment i:

$$\Delta_i = \|I_i\|^2 = \left\| \sum_{j \neq i, k'_i} \vec{h}_{i,k'_i} A_{j,k'_i} P_{j,k'_i} \vec{w}_{j,k'_i} I_{i,k'_i} \right\|^2,$$

where k'$_i \in$ K'$_i$;

calculating a power of the wanted signal of the user equipment i in the active set of the user equipment i:

$$\Gamma_i = \|S_i\|^2 = \left\| \sum_{k_i} P_{i,k_i} \vec{h}_{i,k_i} \vec{w}_{i,k_i} \right\|^2,$$

where k$_i \in$ K$_i$; and in the weight subspace, excluding one or more mutually orthogonal directions from a direction in which the power $\Delta_i$ of the interfering signal of the user equipment i increases, excluding one or more mutually orthogonal from a direction $\Gamma_i$ in which the power of the wanted signal of the user equipment i decreases, and using a weight corresponding to a final remaining direction as a weighted value used by the active site k$_i$.

104: Send the determined weighted value to the corresponding active site, so that the corresponding active site sends a signal to the M user equipments at the same time in a same frequency by using the determined weighted value.

In this embodiment of the present invention, in M user equipments, an active set K$_i$ and an interference set K'$_i$ of a user equipment i are determined according to power measurement values from the user equipment i to N sites, where the active set K$_i$ of the user equipment i includes an identifier k$_i$ of an active site that provides a wanted signal for the user equipment i, the interference set K'$_i$ of the user equipment i includes an identifier k'$_i$ of an interfering site that provides an interfering signal for the user equipment, k$_i \in$ K$_i$, k'$_i \in$ K'$_i$, and i=1, 2, ... M; for the active set K$_i$ of the user equipment i, superposition of sent signals of all other user equipments j of all active sites k$_i$ are cancelled out with each other, to obtain one constraint condition of a weight, and for the M user equipments, M constraint conditions are obtained, and a weight subspace T is determined, where the weight subspace includes M weights, j represents another user equipment in the M user equipments except the user equipment i, and j=1, 2, ... M; j≠i; and one weight is determined in the weight subspace according to an interfering signal of another user equipment j for the user equipment i in the interference set K'$_i$ of the user equipment i and a wanted signal of the user equipment i in the active set K$_i$ of the user equipment i, so that any active site in an active set of each user equipment determines one weighted value, and uses the weighted value as a weight that a corresponding active site uses for sending a signal to the M user equipments. In this way, the fullest extent of suppression of interference between user equipments in the interference set can be implemented based on zero interference between user equipments in the active set. Therefore, a problem in the prior art that when a site sends signals to multiple user equipments at the same time in a same frequency, signal interference between the multiple user equipments is caused is solved, thereby improving service quality of a user equipment.

The following describes a specific implementation of the signal processing method in the embodiment shown in FIG. 1:

It is assumed that, N sites provide a service for M user equipments, and for each user equipment, channel estimation is performed on the N sites, and a transmit power of each site for the user equipments is estimated by means of channel estimation, to generate one user power table and one channel estimation table. After a user equipment measurement is performed, these parameters are reported to the sites to perform a measurement based on a TDD channel reciprocity mode by using a measurement channel. For convenience, in this embodiment, this solution is described by using a site with a single antenna, which can be applied to a case with multiple antennas.

|  | Site 1 | Site 2 | Site N |
| --- | --- | --- | --- |
| User equipment 1 | P$_{1,1}$ | P$_{1,2}$ | P$_{1,N}$ |
| User equipment 2 | P$_{2,1}$ | P$_{2,2}$ | P$_{2,N}$ |
| ... | | | |
| User equipment M | P$_{M,1}$ | P$_{M,2}$ | P$_{M,N}$ |

In addition, each user equipment tests channels of all transmit sites, and normalized channels after the test are shown in the following table:

| System channel measurement table | | | |
| --- | --- | --- | --- |
|  | Site 1 | Site 2 | Site N |
| User equipment 1 | H$_{1,1}$ | H$_{1,2}$ | H$_{1,N}$ |
| User equipment 2 | H$_{2,1}$ | H$_{2,2}$ | H$_{2,N}$ |
| ... | | | |
| User equipment M | H$_{M,1}$ | H$_{M,2}$ | H$_{M,N}$ |

Firstly, an active set, an interference set, and an Idle set are defined for each user equipment. The active set is those sites that consider sending wanted signals to the user equipment; the interference set is those sites of which signal powers are not enough to provide a performance gain for the user equipment but interference levels cannot be ignored; and the Idle set is those remaining sites.

For the site k$_i$ in the active set of the user equipment i, it needs to select a weighted value W$_{ik_i}$ according to channel estimation, and define an active set associated selection function A$_{i,k_i}$, where when the site k belongs to the active set of the user equipment i, A$_{i,k_i}$=1, and when the site k does not belong to the active set of the user equipment i, A$_{i,k_i}$=0; and define an interference set associated selection function I$_{i,j}$, where when the site k' belongs to an interference set of the user equipment i, $$I_{ik'_i} = 1,$$

and when the site k' does not belong to the interference set of the user equipment i, $$I_{ik'_i} = 0.$$

Figure 2:
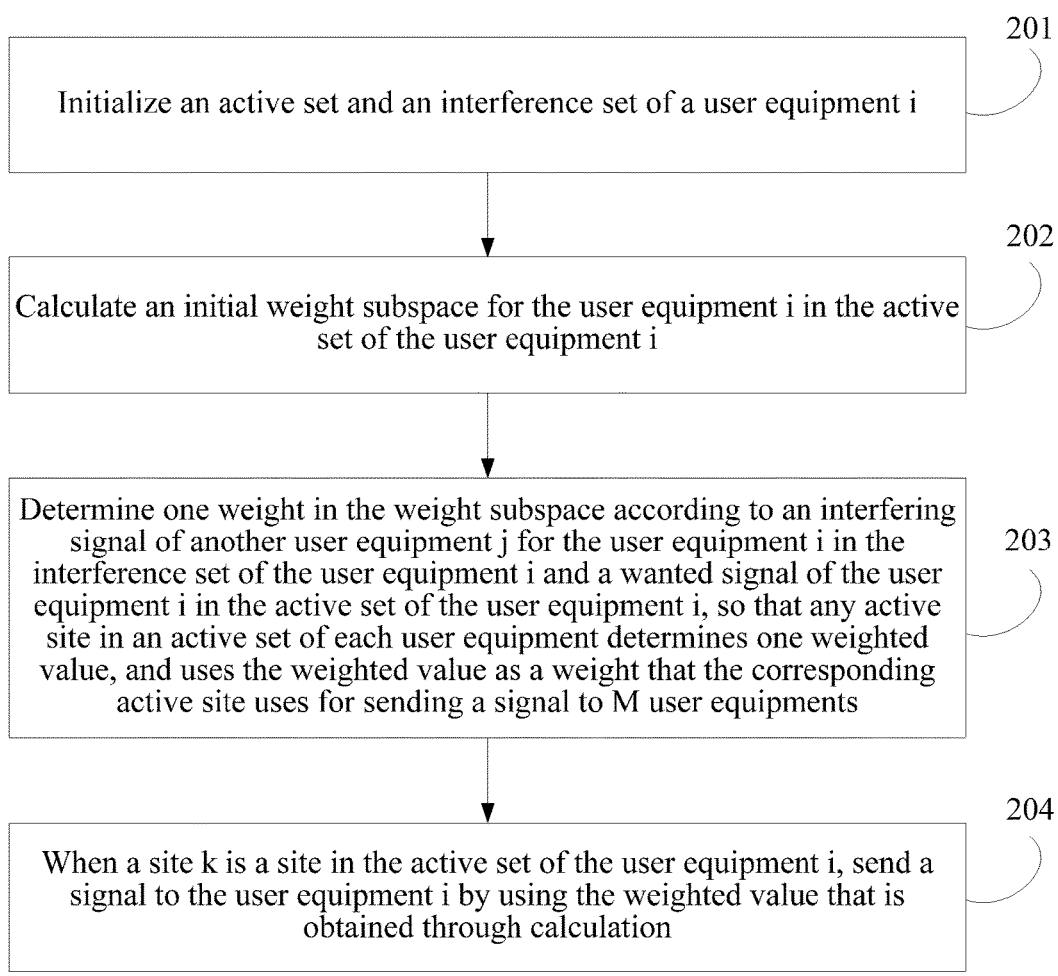
FIG. 2 is a schematic flowchart of a signal processing method according to another embodiment of the present invention.

Based on the system power measurement table and the system channel measurement table that are provided above, FIG. 2 is a schematic flowchart of a signal processing method according to another embodiment of the present invention, and as shown in FIG. 2, the method includes:

201: Initialize an active set and an interference set of a user equipment i.

In this embodiment, two determining thresholds are preset, that is, a threshold of active set (Threshold of Active Set, ToA) and a threshold of interference set (Threshold of Interference Set, ToI).

When $P_{ik} \geq$ ToA, the site k is putted into the active set of the user equipment i; when ToA$>P_{ik}\geq$IoA, the site k is putted into the interference set of the user equipment i; and remaining sites may be putted into, for example, the idle (Idle) set.

An actual radio environment is complex, or deployment positions and transmit powers are not all the same for each site, and therefore adaptive adjustment further needs to be performed, based on a time and a site parameter, on the relevant threshold of active set and threshold of interference set. Adjustment algorithms include, for example, a nominal power proportion algorithm and a maximum capacity algorithm.

The nominal power proportion algorithm includes that:

for different systems, nominal powers of the systems are not all the same, for example, according to a current system definition, a 5 W signal may be radiated, and calculation may be performed according to 30 dB strong coverage signal fading; a site with a receive power greater than 5 mW belongs to the active set, and a site with a measured receive power between 0.1 mW to 5 mW belongs to the interference set; and if a transmit power of another base station is 1 W, the determining thresholds may be considered to be determining thresholds with the nominal 5 W divided by 5.

Calculation according to the maximum capacity algorithm includes that:

a weight calculation and user scheduling are performed by using the algorithm in the foregoing embodiment, a capacity of each user equipment is calculated as: $C_i = \log(1+\Gamma_i/\Delta_1)$, and the threshold of active set is adjusted, for example, firstly the threshold is increased, and the capacity is re-calculated; if capacities of all user equipments increase, the threshold is increased; if capacities of all user equipments decrease, the capacities are re-calculated in a reverse direction, for example, the threshold is decreased; and when a certain threshold value is reached, both an increase and a decrease of the threshold cause the capacities of the user equipments to decrease, and then the threshold remains unchanged.

The foregoing threshold is a semi-persistent adjustment parameter, and generally does not change after system initialization. An adjustment triggering condition includes two types: the first is a periodic adjustment, for example, according to a general wireless system requirement, it is set that an adjustment is started once every 1 minute; and the second is event triggering, in which after a certain scheduling and weight calculation end, when a total capacity of the system and a capacity of a user decrease obviously, a threshold adjustment process is started.

In this embodiment, the adjustment may also be performed according to, for example, demodulation thresholds of a terminal and a base station. The system is a user equipment centered cell. Therefore, the determining thresholds for putting sites into the active set and the interference set are based on a user equipment. When accessing the system, each user equipment may send a demodulation capability as one parameter to a data center server, and the data center server adjusts, based on the capability of the user equipment, determining thresholds of the data center server.

Similarly, for an uplink service, determining thresholds of a base station may also be determined according to a demodulation capability of the base station. That is, uplink and downlink determining thresholds may be different.

In this embodiment, the determining thresholds may also be determined, for example, based on a served system, and the communications system can bear signals of systems including 3G, 4G, 5G, and the like. Demodulation thresholds of the systems are slightly different. After a user accesses the system, a communications system of a user bearer signal is determined, to select determining thresholds used by the user.

In this embodiment, determining thresholds may also be, for example, integrated, and an integrated determining algorithm used in one system implementation is a combination of the foregoing solutions. The used determining thresholds are:

$$\text{ToA} = \text{ToA normal} + \Delta p + \Delta \text{user} + \Delta \text{BS} + \Delta \text{system}$$

and $$\text{IoA} = \text{IoA normal} + \Delta p + \Delta \text{user} + \Delta \text{BS} + \Delta \text{system}$$

In the foregoing formulas, the first item ToA normal is, for example, a threshold corresponding to the nominal power 5 W, $\Delta p$ is an adjustment amount based on a site transmit power, $\Delta$user is an adjustment amount based on a user demodulation capability, $\Delta$BS is an adjustment amount based on a base station demodulation capability, and $\Delta$system is an adjustment amount based on an adjustment amount based on a bearer system.

202: Calculate an initial weight subspace for the user equipment i in the active set of the user equipment i.

The following formula may be used for the initial weight subspace:

s.t.

$$\sum_{j \neq i,k} \vec{h}_{i,k} A_{j,k} P_{j,k} \vec{w}_{j,k} A_{i,k} = 0$$

In the foregoing formula, $k \in N$, that is, the site k is any site in the N sites, i is the user equipment i, j represents the user equipment j, i=1, 2 ... M, j=1, 2 ... M, i≠j, when the site k is a site in the active set of the user equipment i, $A_{i,k}$ is equal to 1, and otherwise, $A_{i,k}$ is equal to 0; and when the site k is a site in the active set of the user equipment j, $A_{j,k}$ is equal to 1, and otherwise, $A_{j,k}$ is equal to 0.

The foregoing formula includes M constraint conditions and N×M weight variants, and therefore is solvable. By using the foregoing formula, interference caused by a site in the active set to the user equipment i when the site sends a signal to another user equipment can be eliminated. The foregoing formula is actually a space solving issue, where with the M constraint conditions removed, the N×M weights have (N−1)×M degrees of freedom. It is assumed that, all weights constitute one column space of N×M dimensions, which casts a shadow on a constrained orthogonal space, and has (N−1)×M dimensions; and it is assumed that, a base of the orthogonal subspace is:

$$\vec{\beta}_1, \vec{\beta}_2, L, \vec{\beta}_{M(N-1)},$$

and the subspace is recorded as T, where each weight is an N×M column vector.

203: Determine one weight in the weight subspace according to an interfering signal of another user equipment j for the user equipment i in the interference set $K'_i$ of the user equipment i and a wanted signal of the user equipment i in the active set $K_i$ of the user equipment i, so that any active site in an active set of each user equipment determines one weighted value, and uses the weighted value as a weight that a corresponding active site uses for sending a signal to M user equipments.

In an optional implementation manner, firstly the interfering signal of the another user equipment for the user equipment i in the interference set of the user equipment i is defined as:

$$I_i = \sum_{j \neq i,k} \vec{h}_{i,k} A_{j,k} P_{j,k} \vec{w}_{j,k} I_{i,k};$$

and
the wanted signal of the user equipment i in the active set of the user equipment i is defined as:

$$S_i = \sum_{k} A_{i,k} P_{i,k} \vec{h}_{i,k} \vec{w}_{i,k};$$

herein all user signals are selected in the foregoing subspace T that is obtained through calculation;

secondly, M maximum target values are obtained through calculation according to $\mathrm{argmax}\|S_i\|^2/(\|I_i\|^2+N_i)$, where $N_i$ is noise of the user equipment i, and then the M maximum target values may be averaged to obtain a weighted value; and a search method used in the foregoing step 203 is performing an exhaustive search in the subspace T, and in a fixed point calculation space, such a search space is limited.

In an optional implementation manner, for the user equipment i, a power is calculated according to the interfering signal and wanted signal of the user equipment i:

$$\Delta_i = \|I_i\|^2 = \left\|\sum_{j \neq i,k} \vec{h}_{i,k} A_{j,k} P_{j,k} \vec{w}_{j,k} I_{i,k}\right\|^2$$

and $$\Gamma_i = \|S_i\|^2 = \left\|\sum_{k} P_{i,k} \vec{h}_{i,k} \vec{w}_{i,k}\right\|^2.$$

For the foregoing formulas, $\Gamma_i$ increased by a gradient and $\Delta_i$ decreased by a gradient are separately solved. The foregoing two gradient values are quadratic forms about the weight, and are quadratic forms with upward openings, and therefore a global minimum value exists. A direction pointing to the global minimum value is simply used as a direction of $\Delta_i$; and a direction opposite to the direction pointing to the global minimum value is simply used as a direction of $\Gamma_i$. In step 202, a space constituted for weights of all user equipments is in the subspace T, and therefore it is assumed that, each weight is represented as a weighted sum of (N−1)×M (in the case of a single antenna) irrelevant vectors $$\vec{\beta}_1, \vec{\beta}_2, L, \vec{\beta}_{M(N-1)}$$

in the subspace T, that is:

$$\vec{W} = \lambda_1 \vec{\beta}_1 + \lambda_2 \vec{\beta}_2 + L\lambda_{M(N-1)} \vec{\beta}_{M(N-1)};$$

and in each different user equipment, there are two suggested directions, which cast shadows separately in the space T, and are separately assumed to be $$\vec{A}_i = \alpha_{i,1} \vec{\beta}_1 + \alpha_{i,2} \vec{\beta}_2 + L\alpha_{i,M(N-1)} \vec{\beta}_{M(N-1)}$$

and $$\vec{B}_i = \beta_{i,1} \vec{\beta}_1 + \beta_{i,2} \vec{\beta}_2 + L\beta_{i,M(N-1)} \vec{\beta}_{M(N-1)}.$$

An average direction of the 2M directions is used, that is, the direction is adjusted to be $$\left(\sum_i \vec{A}_i + \vec{B}_i\right)/2M,$$

and it can be globally ensured that powers of most user signals increase, but interference powers decrease.

In an optional implementation manner, for the user equipment i, a power is calculated according to an interfering signal and a wanted signal of the user equipment i:

$$\Delta_i = \|I_i\|^2 = \left\|\sum_{j \neq i,k} \vec{h}_{i,k} A_{j,k} P_{j,k} \vec{w}_{j,k} I_{i,k}\right\|^2$$

and $$\Gamma_i = \|S_i\|^2 = \left\|\sum_{k} P_{i,k} \vec{h}_{i,k} \vec{w}_{i,k}\right\|^2.$$

For the foregoing formulas, $\Gamma_i$ increased by a gradient and $\Delta_i$ decreased by a gradient are separately solved. The foregoing two values are quadratic forms about the weight, and are quadratic forms with upward openings. In Embodiment 2, selection is performed from an optimal direction in which a signal is enhanced and interference is reduced for each user, but a mutually exclusive behavior between two users may occur with such an algorithm. For example, a direction in which a signal of a user 1 is enhanced is a direction in which interference to a user 2 is enhanced. In this embodiment, an adjustment is performed, for example, an adjustment of the weight is determined by using a getting rid method, for example, excluding (N−1)/2 mutually orthogonal directions for each user equipment, where these directions cause the signal power $\Gamma_i$ of the user equipment i to decrease, excluding (N−1)/2 mutually orthogonal directions for each user equipment, where these directions cause the interference power $\Delta_i$ of the user equipment i to increase, and excluding such N−1 directions for each user equipment, where one direction less may be excluded for the last user equipment. In this way, in the remaining direction, it is ensured that, for each user, the signal power increases and the interference power does not increase.

204: When a site k is a site in the active set of the user equipment i, the site k sends a signal to the user equipment i by using the weighted value that is obtained through calculation.

If the site is not a site in the active set of the user equipment i, a signal does not need to be sent to the user equipment i.

In this embodiment, if the site uses X transmit antennas, the weights $\vec{w}_{j,k}$ are all column vectors of X dimensions, and the N×M weights constitute a column vector of N×M×X dimensions. The M constraint conditions are still removed in step 202, and the orthogonal subspace is a vector space of N×M×X−M dimensions. Comparatively, for multiple antennas, there is a larger orthogonal subspace, and therefore a matching weight is more easily found.

The following describes, by using an example, how to determine one weighted value in a weight subspace of any active site in an active set of each user equipment in step 203:

Herein, description is provided by using an example in which M=3 user equipments and N=4 sites, there is a single antenna for each site, and the signal sent by the site k to the user equipment i must be weighted by using the weight $\vec{w}_{j,k}$, where $\vec{w}_{j,k}$, is a complex number. In this way, there are M×N=4×3=12 weights, which constitute one weight vector of 12 dimensions, of which a value space is $C^{12}$. Description is provided by using one example.

It is assumed that, an active set associated coefficient is as follows:

|        | Site 1        | Site 2        | Site 3        | Site 4        |
|--------|---------------|---------------|---------------|---------------|
| User 1 | $A_{1,1} = 1$ | $A_{1,2} = 1$ | $A_{1,3} = 1$ | $A_{1,4} = 0$ |
| User 2 | $A_{2,1} = 0$ | $A_{2,2} = 1$ | $A_{2,3} = 1$ | $A_{2,4} = 1$ |
| User 3 | $A_{3,1} = 1$ | $A_{3,2} = 1$ | $A_{3,3} = 0$ | $A_{3,4} = 1$ |

It is assumed that, an interference set associated coefficient is as follows:

|        | Site 1        | Site 2        | Site 3        | Site 4        |
|--------|---------------|---------------|---------------|---------------|
| User 1 | $I_{1,1} = 0$ | $I_{1,2} = 0$ | $I_{1,3} = 0$ | $I_{1,4} = 1$ |
| User 2 | $I_{2,1} = 1$ | $I_{2,2} = 0$ | $I_{2,3} = 0$ | $I_{2,4} = 0$ |
| User 3 | $I_{3,1} = 0$ | $I_{3,2} = 0$ | $I_{3,3} = 1$ | $I_{3,4} = 0$ |

In an optional implementation manner, for the user equipment i, constraints for the weight of the user equipment i to meet s.t.

$$\sum_{j \neq i,k} \vec{h}_{i,k} A_{j,k} P_{j,k} \vec{w}_{j,k} A_{i,k} = 0$$

are:

a constraint condition for a user equipment 1:

$$\vec{h}_{1,2} P_{2,2} \vec{w}_{2,2} + \vec{h}_{1,3} P_{2,3} \vec{w}_{2,3} + \vec{h}_{1,1} P_{3,1} \vec{w}_{3,1} + \vec{h}_{1,2} P_{3,2} \vec{w}_{3,2} = 0$$

a constraint condition for a user equipment 2:

$$\vec{h}_{2,2} P_{1,2} \vec{w}_{1,2} + \vec{h}_{2,3} P_{1,3} \vec{w}_{1,3} + \vec{h}_{2,2} P_{3,2} \vec{w}_{3,2} + \vec{h}_{2,4} P_{3,4} \vec{w}_{3,4} = 0$$

and a constraint condition for a user equipment 3:

$$\vec{h}_{3,1} P_{1,1} \vec{w}_{1,1} + \vec{h}_{3,2} P_{1,2} \vec{w}_{1,2} + \vec{h}_{3,2} P_{2,2} \vec{w}_{2,2} + \vec{h}_{3,4} P_{2,4} \vec{w}_{2,4} = 0.$$

By using a matrix constraint, the foregoing constraint conditions can be expanded as weight vector (that is, 12 dimensions) matrix conditions.

$$\begin{bmatrix} 0, & 0, & 0, & 0, & 0, & \vec{h}_{1,2}P_{2,2}, & \vec{h}_{1,3}P_{2,3}, & 0, & \vec{h}_{1,1}P_{3,1}, & \vec{h}_{1,2}P_{3,2}, & 0, & 0 \\ 0, & \vec{h}_{2,2}P_{1,2}, & \vec{h}_{2,3}P_{1,3}, & 0, & 0, & 0, & 0, & 0, & 0, & \vec{h}_{2,2}P_{3,2}, & 0, & \vec{h}_{2,4}P_{3,4} \\ \vec{h}_{3,1}P_{1,1}, & \vec{h}_{3,2}P_{1,2}, & 0, & 0, & 0, & \vec{h}_{3,2}P_{2,2}, & 0, & \vec{h}_{3,4}P_{2,4}, & 0, & 0, & 0, & 0 \end{bmatrix} \begin{bmatrix} \vec{w}_{1,1} \\ \vec{w}_{1,2} \\ \vec{w}_{1,3} \\ \vec{w}_{1,4} \\ \vec{w}_{2,1} \\ \vec{w}_{2,2} \\ \vec{w}_{2,3} \\ \vec{w}_{2,4} \\ \vec{w}_{3,1} \\ \vec{w}_{3,2} \\ \vec{w}_{3,3} \\ \vec{w}_{3,4} \end{bmatrix} = \vec{0}_{12 \times 1}.$$

In a $C^{12}$ Euclidean space, due to the 3 constraint conditions, the subspace T is solved as one $C^9$ Euclidean subspace.

An exhaustive method is used, and because a common algorithm is a fixed point operation, and therefore under the foregoing constraints, a weight searched for in a search subspace thereof is a space with a finite number of weights. A search algorithm thereof is as follows:

For each weight, firstly each user signal and each interfering signal are calculated, separately as follows:

A user signal $$S_i = \sum_k A_{i,k} P_{i,k} \vec{h}_{i,k} \vec{w}_{i,k}$$

is expanded for each user as follows:
a signal of the user 1:

$$S_1 = P_{1,1}\vec{h}_{1,1}\vec{w}_{1,1} + P_{1,2}\vec{h}_{1,2}\vec{w}_{1,2} + P_{1,3}\vec{h}_{1,3}\vec{w}_{1,3}$$

a signal of the user 2:

$$S_2 = P_{2,2}\vec{h}_{2,2}\vec{w}_{2,2} + P_{2,3}\vec{h}_{2,3}\vec{w}_{2,3} + P_{2,4}\vec{h}_{2,4}\vec{w}_{2,4}$$

and
a signal of the user 3:

$$S_3 = P_{3,1}\vec{h}_{3,1}\vec{w}_{3,1} + P_{3,3}\vec{h}_{3,3}\vec{w}_{3,3} + P_{3,4}\vec{h}_{3,4}\vec{w}_{3,4}.$$

For interference caused by another user to the user equipment i, because interference of the active set is completely eliminated, only the interference set is considered:

$$I_i = \sum_{j \ne i, k} \vec{h}_{i,k} A_{j,k} P_{j,k} \vec{w}_{j,k} I_{i,k},$$

which is expanded for each user equipment as follows:
an interfering signal of the user 1:

$$I_1 = \vec{h}_{1,4} P_{2,4} \vec{w}_{2,4} + \vec{h}_{1,4} P_{3,4} \vec{w}_{3,4}$$

an interfering signal of the user 2:

$$I_2 = \vec{h}_{2,1} P_{1,1} \vec{w}_{1,1} + \vec{h}_{2,1} P_{3,1} \vec{w}_{3,1}$$

and
an interfering signal of the user 3:

$$I_3 = \vec{h}_{3,3} P_{1,3} \vec{w}_{1,3} + \vec{h}_{2,3} P_{2,3} \vec{w}_{2,3}.$$

A signal-to-noise ratio (signal-to-noise ratio, SNR) of each user is equal to: $SNR_i = \|S_i\|^2 / (\|I_i\|^2 + N_i)$.

A detailed algorithm is as follows: it is initialized that, $C_{max} = 0$, and then (1) for each weight, a throughput of each user is calculated according to a Shannon formula: $C_i = \log(1 + SNR_i)$, $i = 1, 2, 3$, and a sum of all throughputs: $C = C_1 + C_2 + C_3$;

(2) if $C_i \le T_i$ where $i = 1, 2$, or 3, this group of vectors are discarded, and a next group of vectors are considered;

(3) otherwise, if $C \le C_{max}$, this group of vectors are discarded, and a next group of vectors are considered; and (4) if $C > C_{max}$, this group of vectors is stored, and replaces previously stored vectors in a memory space.

In an optional implementation manner, the foregoing calculated weight vector is:

$$\vec{W} = \begin{bmatrix} \vec{w}_{1,1} \\ \vec{w}_{1,2} \\ \vec{w}_{1,3} \\ \vec{w}_{1,4} \\ \vec{w}_{2,1} \\ \vec{w}_{2,2} \\ \vec{w}_{2,3} \\ \vec{w}_{2,4} \\ \vec{w}_{3,1} \\ \vec{w}_{3,2} \\ \vec{w}_{3,3} \\ \vec{w}_{3,4} \end{bmatrix}.$$

Therefore, it is assumed that the subspace T is solved as one $C^9$ Euclidean subspace, of which a base is set to:

$$\vec{\beta}_1, \vec{\beta}_2, L, \vec{\beta}_9,$$

where each $$\vec{\beta}_i$$

is a column vector of 12 dimensions. Each candidate vector $$\vec{W}$$

may be represented as a linear sum of $$\vec{\beta}_1, \vec{\beta}_2, L, \vec{\beta}_9.$$

$$\vec{W} = \lambda_1 \vec{\beta}_1 + \lambda_2 \vec{\beta}_2 + L \lambda_9 \vec{\beta}_9,$$

where each $\lambda_i$ is a complex number;

a signal of the user 1:

$$S_1 = P_{1,1}\vec{h}_{1,1}\vec{w}_{1,1} + P_{1,2}\vec{h}_{1,2}\vec{w}_{1,2} + P_{1,3}\vec{h}_{1,3}\vec{w}_{1,3}$$

a signal of the user 2:

$$S_2 = P_{2,2}\vec{h}_{2,2}\vec{w}_{2,2} + P_{2,3}\vec{h}_{2,3}\vec{w}_{2,3} + P_{2,4}\vec{h}_{2,4}\vec{w}_{2,4}$$

and
a signal of the user 3:

$$S_3 = P_{3,1}\vec{h}_{3,1}\vec{w}_{3,1} + P_{3,3}\vec{h}_{3,3}\vec{w}_{3,3} + P_{3,4}\vec{h}_{3,4}\vec{w}_{3,4}.$$

The signal may be represented as a sum of a matrix and $$\vec{W},$$

for example:

$$S_1 = [P_{1,1}\vec{h}_{1,1},\ P_{1,2}\vec{h}_{1,2},\ P_{1,3}\vec{h}_{1,3},\ 0,0,\ 0,\ 0,\ 0,0,\ 0,\ 0,\ 0,]\vec{W}$$
$$= \Theta_1 \vec{W} = \Theta_1(\lambda_1\vec{\beta}_1 + \lambda_2\vec{\beta}_2 + L\lambda_9\vec{\beta}_9).$$

$$\Gamma_1 = \|S_1\|^2 \sum_{\substack{i=1\ldots9;\\j=1\ldots9;}} \vec{\beta}_j^H \lambda_i^* \lambda_j \Theta_1^H \Theta_1 \vec{\beta}_j,$$

which is a quadratic form about $\lambda_i$; and similarly, $$\Gamma_2 = \|S_2\|^2 \sum_{\substack{i=1\ldots9;\\j=1\ldots9;}} \vec{\beta}_j^H \lambda_i^* \lambda_j \Theta_2^H \Theta_2 \vec{\beta}_j$$

and $$\Gamma_3 = \|S_3\|^2 \sum_{\substack{i=1\ldots9;\\j=1\ldots9;}} \vec{\beta}_j^H \lambda_i^* \lambda_j \Theta_3^H \Theta_3 \vec{\beta}_j$$

Likewise,
an interfering signal of the user 1:

$$I_1 = \vec{h}_{1,4}P_{2,4}\vec{w}_{2,4} + \vec{h}_{1,4}P_{3,4}\vec{w}_{3,4}$$

an interfering signal of the user 2:

$$I_2 = \vec{h}_{2,1}P_{1,1}\vec{w}_{1,1} + \vec{h}_{2,1}P_{3,1}\vec{w}_{3,1}$$

and
an interfering signal of the user 3:

$$I_3 = \vec{h}_{3,3}P_{1,3}\vec{w}_{1,3} + \vec{h}_{2,3}P_{2,3}\vec{w}_{2,3}.$$

Powers of the interfering signals are represented as quadratic forms about $\lambda_i$:

$$\Delta_1 = \|I_1\|^2 \sum_{\substack{i=1\ldots9;\\j=1\ldots9;}} \vec{\beta}_j^H \lambda_i^* \lambda_j \Lambda_1^H \Lambda_1 \vec{\beta}_j$$

$$\Delta_2 = \|I_2\|^2 \sum_{\substack{i=1\ldots9;\\j=1\ldots9;}} \vec{\beta}_j^H \lambda_i^* \lambda_j \Lambda_2^H \Lambda_2 \vec{\beta}_j$$

and $$\Delta_3 = \|I_3\|^2 \sum_{\substack{i=1\ldots9;\\j=1\ldots9;}} \vec{\beta}_j^H \lambda_i^* \lambda_j \Lambda_3^H \Lambda_3 \vec{\beta}_j.$$

For an initial value, it may be initialized that, $$\lambda_i = \sqrt{\frac{1}{9}} = \frac{1}{3},$$

where i=1 ... 9. One $C^9$ vector exists for each $\Gamma_1$, and an increase of $\Gamma_1$ at $$\vec{\lambda} = \begin{bmatrix} \lambda_1 \\ \lambda_2 \\ \vdots \\ \lambda_9 \end{bmatrix}$$

is the fastest; in other words, $$\vec{\lambda} + \vec{\delta} = \begin{bmatrix} \lambda_1 + \delta_1 \\ \lambda_2 + \delta_2 \\ \vdots \\ \lambda_9 + \delta_9 \end{bmatrix},$$

where $$\|\vec{\delta}\|^2 = \Xi,$$

and $\Xi$ is equal to an algorithm adjustment step. Herein, for $\Gamma_1$, a maximum adjustment direction is set to $$\vec{\delta}_1,$$

and similarly, for $\Gamma_2$ and $\Gamma_3$, optimal adjustment directions are respectively $\vec{\delta}_2$ and $\vec{\delta}_3$.

For an interfering signal, a direction in which $\Delta_1$ decreases is selected, a maximum decrease direction is set to $$\vec{\eta}_1,$$

and similarly for $\Delta_2$ and $\Delta_3$, $$\vec{\eta}_2 \text{ and } \vec{\eta}_3$$

are respectively selected.

Therefore, for a comprehensive optimal adjustment vector $$\vec{\theta} = \vec{\delta}_1 + \vec{\delta}_2 + \vec{\delta}_3 + \vec{\eta}_1 + \vec{\eta}_2 + \vec{\eta}_3$$

is selected, and it should be noticed that herein it further needs to normalize a modulus of $\vec{\theta}$, that is, finally $$\|\vec{\theta}\|^2 = \Xi.$$

In an optional implementation manner, the foregoing calculated weight vector is:

$$\vec{W} = \begin{bmatrix} \vec{w}_{1,1} \\ \vec{w}_{1,2} \\ \vec{w}_{1,3} \\ \vec{w}_{1,4} \\ \vec{w}_{2,1} \\ \vec{w}_{2,2} \\ \vec{w}_{2,3} \\ \vec{w}_{2,4} \\ \vec{w}_{3,1} \\ \vec{w}_{3,2} \\ \vec{w}_{3,3} \\ \vec{w}_{3,4} \end{bmatrix}.$$

Therefore, it is assumed that, the subspace T is solved as one $C^9$ Euclidean subspace, of which a base is:

$$\vec{\beta}_1, \vec{\beta}_2, L, \vec{\beta}_9,$$

where each $\vec{\beta}_i$ is a column vector of 12 dimensions. Each candidate vector $\vec{W}$ may be represented as a linear sum of $\vec{\beta}_1, \vec{\beta}_2, L, \vec{\beta}_9$. $\vec{W} = \lambda_1 \vec{\beta}_1 + \lambda_2 \vec{\beta}_2 + L\lambda_9 \vec{\beta}_9$, where each $\lambda_i$ is a complex number;

a signal of the user 1:

$$S_1 = P_{1,1}\vec{h}_{1,1}\vec{w}_{1,1} + P_{1,2}\vec{h}_{1,2}\vec{w}_{1,2} + P_{1,3}\vec{h}_{1,3}\vec{w}_{1,3}$$

a signal of the user 2:

$$S_2 = P_{2,2}\vec{h}_{2,2}\vec{w}_{2,2} + P_{2,3}\vec{h}_{2,3}\vec{w}_{2,3} + P_{2,4}\vec{h}_{2,4}\vec{w}_{2,4}$$

and a signal of the user 3:

$$S_3 = P_{3,1}\vec{h}_{3,1}\vec{w}_{3,1} + P_{3,3}\vec{h}_{3,3}\vec{w}_{3,3} + P_{3,4}\vec{h}_{3,4}\vec{w}_{3,4}$$

The signal may be represented as a sum of a matrix and $\vec{W}$, for example:

$$S_1 = [P_{1,1}\vec{h}_{1,1}, P_{1,2}\vec{h}_{1,2}, P_{1,3}\vec{h}_{1,3}, 0, 0, 0, 0, 0, 0, 0, 0, 0]\vec{W}$$
$$= \Theta_1 \vec{W}$$
$$= \Theta_1 (\lambda_1 \vec{\beta}_1 + \lambda_2 \vec{\beta}_2 + L\lambda_9 \vec{\beta}_9).$$

$$\Gamma_1 = \|S_1\|^2 = \sum_{\substack{i=1\ldots 9; \\ j=1\ldots 9;}} \vec{\beta}_i^H \lambda_i^* \lambda_j \Theta_1^H \Theta_1 \vec{\beta}_j,$$

which is a quadratic form about $\lambda_i$; and similarly, $$\Gamma_2 = \|S_2\|^2 = \sum_{\substack{i=1\ldots 9; \\ j=1\ldots 9;}} \vec{\beta}_i^H \lambda_i^* \lambda_j \Theta_2^H \Theta_2 \vec{\beta}_j \text{ and}$$

$$\Gamma_3 = \|S_3\|^2 = \sum_{\substack{i=1\ldots 9; \\ j=1\ldots 9;}} \vec{\beta}_i^H \lambda_i^* \lambda_j \Theta_3^H \Theta_3 \vec{\beta}_j.$$

Likewise, it is calculated that:

an interfering signal of the user 1:

$$I_1 = \vec{h}_{1,4}P_{2,4}\vec{w}_{2,4} + \vec{h}_{1,4}P_{3,4}\vec{w}_{3,4}$$

an interfering signal of the user 2:

$$I_2 = \vec{h}_{2,1}P_{1,1}\vec{w}_{1,1} + \vec{h}_{2,1}P_{3,1}\vec{w}_{3,1}$$

and an interfering signal of the user 3:

$$I_3 = \vec{h}_{3,3}P_{1,3}\vec{w}_{1,3} + \vec{h}_{2,3}P_{2,3}\vec{w}_{2,3}.$$

Powers of the interfering signals are represented as quadratic forms about $\lambda_i$:

$$\Delta_1 = \|I_1\|^2 = \sum_{\substack{i=1\ldots9;\\j=1\ldots9}} \vec{\beta}_i^H \lambda_i^* \lambda_j \Lambda_1^H \Lambda_1 \vec{\beta}_j$$

$$\Delta_2 = \|I_2\|^2 = \sum_{\substack{i=1\ldots9;\\j=1\ldots9}} \vec{\beta}_i^H \lambda_i^* \lambda_j \Lambda_2^H \Lambda_2 \vec{\beta}_j \text{ and}$$

$$\Delta_3 = \|I_3\|^2 = \sum_{\substack{i=1\ldots9;\\j=1\ldots9;}} \vec{\beta}_i^H \lambda_i^* \lambda_j \Lambda_3^H \Lambda_3 \vec{\beta}_j.$$

For simple description, 1 direction is excluded each time. The $\vec{\delta}$ vector is selected in the same way as above: firstly, one $\vec{\delta}_1$ direction is calculated, where this direction is a direction in which $\Gamma_1$ decreases the most when a weight $$\vec{\lambda} + \vec{\delta} = \begin{bmatrix} \lambda_1 + \delta_1 \\ \lambda_2 + \delta_2 \\ \vdots \\ \lambda_9 + \delta_9 \end{bmatrix}$$

is used. It is set that, a space $U_1$ is a $C^9$ subspace, where an inner product between each vector in this space and $\vec{\delta}_1^t$, is 0, another direction $\vec{\delta}_2$ in which $\Gamma_2$ decreases the most may further be selected in $U_1$, and then a subspace $U_2$ is selected in $U_1$, where an inner product between each vector in $U_2$ and $\vec{\delta}_2$ is 0, herein $U_2$ is a $C^9$ subspace, and dimensions of the subspace have 9−2=7 dimensions. Likewise, for $\Gamma_3$, 1 direction is excluded, to obtain $U_3$ that is a space of 6 dimensions.

Similarly, for $\Delta_i$ (i=1, 2, and 3), one direction in which $\Delta_i$ increases is excluded, and then $U_6$ is finally obtained, which is a space of 3 dimensions.

Method 1: One direction may be selected in $U_6$ for the adjustment.

Method 2: It may still be selected that one direction is removed separately based on $\Gamma_1$ and $\Gamma_2$ to obtain $U_8$, which is a vector of one dimension, and then only this vector can be selected for $\vec{\delta}$.

It should be noticed that, for all final adjustment vectors, moduli need to be normalized to be equal to the step, that is, $$\|\vec{\theta}\|^2 = \Xi.$$

The signal processing method provided in this embodiment of the present invention is a new algorithm of hierarchical interference suppression and beam forming, can implement the fullest extent of suppression of interference between users in the interference set based on zero interference between user equipments in the active set. In wireless intensive networking, the method can enable all user equipments to use a same frequency band at the same time, and can increase a system capacity for 1000 times of performance gain theoretically.

For interference suppression of the interference set, besides a gradient algorithm, some standard interference suppression algorithms may further be included and the present invention is not limited thereto, for example, algorithms such as MMSE, IRT, and Null forming; and these algorithms are well known algorithms, and all algorithm engineers in the art can apply these algorithms to a wireless communications system that achieves a high density and a high power by means of hierarchical interference removal, which is putted forward in this patent. Therefore, a capacity of the communications system is improved.

Figure 3:
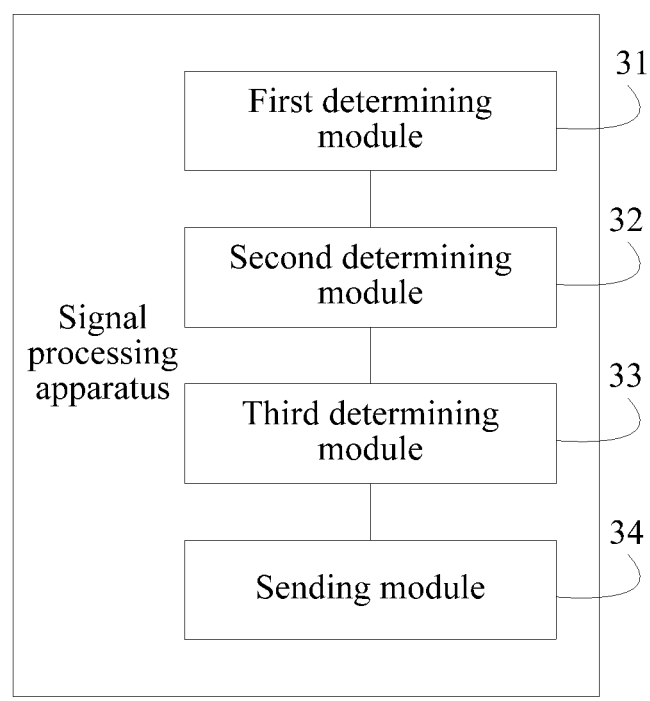
FIG. 3 is a schematic structural diagram of a signal processing apparatus according to an embodiment of the present invention.

FIG. 3 is a schematic structural diagram of a signal processing apparatus according to an embodiment of the present invention. As shown in FIG. 3, the apparatus includes:

a first determining module 31, configured to: in M user equipments, determine an active set $K_i$ and an interference set $K'_i$ of a user equipment i according to power measurement values from the user equipment i to N sites, where the active set $K_i$ of the user equipment i includes an identifier $k_i$ of an active site that provides a wanted signal for the user equipment i, the interference set $K'_i$ of the user equipment i includes an identifier $k'_i$ of an interfering site that provides an interfering signal for the user equipment, $k_i \in K_i$, $k'_i \in K'_i$, i=1, 2, . . . M, M is an integer greater than or equal to 1, and N is an integer greater than or equal to 1;

a second determining module 32, configured to: on the basis of the active set and the interference set that are determined by the first determining module, for the active set $K_i$ of the user equipment i, make superposition of sent signals of all other user equipments j of all active sites $k_j$ cancelled out with each other, to obtain one constraint condition of a weight, and for the M user equipments, obtain M constraint conditions, and determine a weight subspace T, where the weight subspace includes M weights, j represents another user equipment in the M user equipments except the user equipment i, and j=1, 2, . . . M; j≠i; and a third determining module 33, configured to: on the basis of the weight subspace determined by the second determining module, determine one weight in the weight subspace according to an interfering signal of another user equipment j for the user equipment i in the interference set $K'_i$ of the user equipment i and a wanted signal of the user equipment i in the active set $K_i$ of the user equipment i, so that any active site in an active set of each user equipment determines one weighted value, and uses the weighted value as a weight that a corresponding active site uses for sending a signal to the M user equipments.

Optionally, the first determining module 31 is specifically configured to:

in the M user equipments, according to the power measurement values from the user equipment i to the N sites, if a power measurement value from the user equipment i to a site k is greater than or equal to a preset activation threshold value, determining the site k as an active site $k_i$ of the user equipment i, and adding the site k to the active set $K_i$ of the user equipment i, where k=1, 2, . . . , N and $k_i$=1, 2, . . . , N; or if a power measurement value from the user equipment i to a site k is less than a preset activation threshold value, and greater than or equal to a preset interference threshold value, determining the site k as an interfering site $k'_i$ of the user equipment i, and adding the site k to the interference set $K'_i$ of the user equipment i.

Optionally, the constraint condition of the weight obtained by the second determining module 32 is:

$$\text{s.t.} \sum_{j \ne i, k_i} \overset{r}{h}_{i,k_i} A_{j,k_i} P_{j,k_i} \overset{r}{w}_{j,k_i} A_{i,k_i} = 0,$$

where i=1, 2 . . . M and j=1, 2, . . . M; j≠i,
i is an identifier of the user equipment i, and $k_i$ is an identifier of an active site in the active set of the user equipment i;

$$\overset{r}{h}_{i,k_i}$$

is a channel measurement value from the user equipment i to the active site $k_i$ $A_{j,k_i}$ is equal to 1 or 0, where when the active site $k_i$ of the user equipment i is an active site of another user equipment j, $A_{j,k_i}$ is equal to 1, and when the active site $k_i$ of the user equipment i is not an active site of another user equipment j, $A_{j,k_i}$ is equal to 0;

$P_{j,k_i}$ is a power measurement value from the user equipment j to the active site $k_i$ of the user equipment i;

$A_{i,k_i}$ is equal to 1 or 0, where when the site k is an active site of the user equipment i, $A_{i,k_i}$ is equal to 1, and when the site k is not an active site of the user equipment i, $A_{i,k_i}$ is equal to 0; and $$\overset{r}{w}_{j,k_i}$$

is a weight used by the active site $k_i$ of the user equipment i when sending a signal to the another user equipment j.

Optionally, the third determining module 33 is specifically configured to:
calculate the interfering signal of the another user equipment j for the user equipment i in the interference set $K'_i$ of the user equipment i:

$$I_i = \sum_{j \ne i, k'_i} \overset{r}{h}_{i,k'_i} A_{j,k'_i} P_{j,k'_i} \overset{r}{w}_{j,k'_i} I_{i,k'_i},$$

where $k'_i \in K'_i$;
calculate the wanted signal of the user equipment i in the active set of the user equipment i:

$$S_i = \sum_{k_i} A_{i,k_i} P_{i,k_i} \overset{r}{h}_{i,k_i} \overset{r}{w}_{i,k_i}, \text{ where } k_i \in K_i;$$

and
determine target values of M maximum weights according to $\text{argmax}\|S_i\|^2/(\|I_i\|^2+N_i)$, calculate an average value of the target values of the M maximum weights, and use the average value as a weighted value used by the active site $k_i$, where $N_i$ noise corresponding to the user equipment i.

Optionally, the third determining module 33 is specifically configured to:
calculate a power of the interfering signal of the another user equipment j for the user equipment i in the interference set $K'_i$ of the user equipment i:

$$\Delta_i = \|I_i\|^2 = \left\| \sum_{j \ne i, k'_i} \overset{r}{h}_{i,k'_i} A_{j,k'_i} P_{j,k'_i} \overset{r}{w}_{j,k'_i} I_{i,k'_i} \right\|^2,$$

where $k'_i \in K'_i$;
calculate a power of the wanted signal of the user equipment i in the active set of the user equipment i:

$$\Gamma_i = \|S_i\|^2 = \left\| \sum_{k_i} P_{i,k_i} \overset{r}{h}_{i,k_i} \overset{r}{w}_{i,k_i} \right\|^2,$$

where $k_i \in K_i$; and
in the weight subspace of the active site $k_i$, use weights corresponding to a minimum value of $\Delta_i$ and a maximum value of $\Gamma_i$ as weighted values used by the active site $k_i$.

Optionally, the third determining module 33 is specifically configured to:
calculate a power of the interfering signal of the another user equipment j for the user equipment i in the interference set $K'_i$ of the user equipment i:

$$\Delta_i = \|I_i\|^2 = \left\| \sum_{j \ne i, k'_i} \overset{r}{h}_{i,k'_i} A_{j,k'_i} P_{j,k'_i} \overset{r}{w}_{j,k'_i} I_{i,k'_i} \right\|^2,$$

where $k'_i \in K'_i$;
calculate a power of the wanted signal of the user equipment i in the active set of the user equipment i:

$$\Gamma_i = \|S_i\|^2 = \left\| \sum_{k_i} P_{i,k_i} \overset{r}{h}_{i,k_i} \overset{r}{w}_{i,k_i} \right\|^2,$$

where $k_i \in K_i$; and
in the weight subspace, exclude one or more mutually orthogonal directions from a direction in which the power $\Delta_i$ of the interfering signal of the user equipment i increases, exclude one or more mutually orthogonal from a direction $\Gamma_i$ which the power of the wanted signal of the user equipment i decreases, and use a weight corresponding to a final remaining direction as a weighted value used by the active site $k_i$.

Optionally, adaptive adjustment is performed on the activation threshold value according to an activation threshold corresponding to a nominal power, based on an adjustment amount of a site transmit power, based on an adjustment amount of a user demodulation capability, based on an adjustment amount of a base station demodulation capability, and/or based on an adjustment amount of a bearer system; and
adaptive adjustment is performed on the interference threshold value according to an interference threshold corresponding to the nominal power, based on the adjustment amount of the site transmit power, based on the adjustment amount of the user demodulation capability, based on the adjustment amount of the base station demodulation capability, and/or based on the adjustment amount of the bearer system.

Optionally, the apparatus further includes:

a sending module 34, configured to send the weighted value determined by the third determining module 33 to the corresponding active site, so that the corresponding active site sends a signal to the M user equipments at the same time in a same frequency by using the determined weighted value.

Technical effects of the apparatus in this embodiment are the same as those of the signal processing method in the embodiment shown in FIG. 1 or FIG. 2, and details are not provided again.

Figure 4:
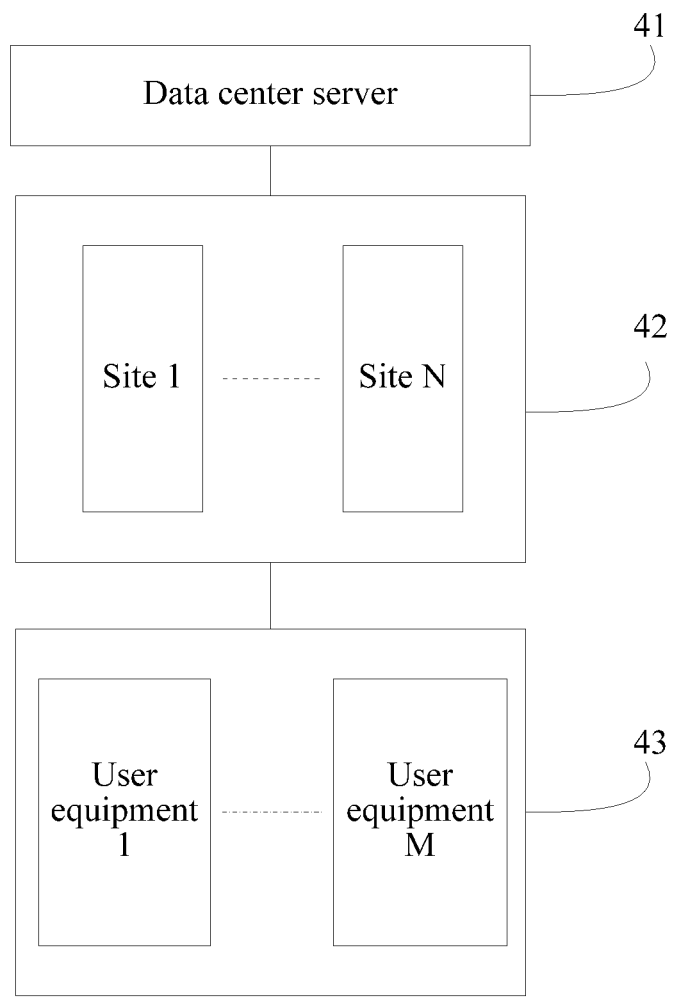
FIG. 4 is a schematic structural diagram of a signal processing system according to an embodiment of the present invention.

FIG. 4 is a schematic structural diagram of a signal processing system according to an embodiment of the present invention. As shown in FIG. 4, the system includes: a data center server 41, N sites 42, and M user equipments 43, where the data center server includes the signal processing apparatus in the embodiment shown in FIG. 3;

each user equipment in the M user equipments is configured to measure channel measurement values and power measurement values from the user equipment to the N sites, and send, to corresponding sites, the channel measurement values and the power measurement values from the user equipment to the N sites, which are obtained through measurement;

each site in the N sites is configured to detect channel measurement values and power measurement values from the site to the M user equipments; or separately receive channel measurement values and power measurement values from the M user equipments to the site, which are sent by the M user equipments; and each site in the N sites is further configured to send the channel measurement values and the power measurement values from the site to the M user equipments to the data center server, so that the server executes the signal processing method in the embodiment shown in FIG. 1 or FIG. 2.

Optionally, the data center server is further configured to determine user equipment scheduling information corresponding to the sites, and perform grouping of sent signals of the user equipments and waveform synthesis for the sites according to the user equipment scheduling information corresponding to the sites; and the data center server is further configured to perform calculation of user equipment waveforms, weighting of weights, and weighting of the user equipment waveforms according to weighted values corresponding to the sites and obtained by using the signal processing method in the embodiment shown in FIG. 1 or FIG. 2.

Optionally, the data center server is further configured to send the synthesized site waveforms, the calculated user equipment waveforms, and the weighted values to corresponding sites, so that the sites send signals to the user equipments according to corresponding site waveforms, user equipment waveforms, and weighted values; and the data center server is further configured to perform uplink processing according to the signals sent by the sites, the grouping of the sent signals of the user equipments, and the weighting of the user equipment waveforms.

Optionally, each site in the N sites is further configured to: according to weighted values and user scheduling information that are sent by the data center server, perform calculation of user equipment waveforms and weighting of weights, and perform calculation of site waveforms, and send signals to the user equipments according to the site waveforms, the user equipment waveforms, and the weighted values.

Figure 5:
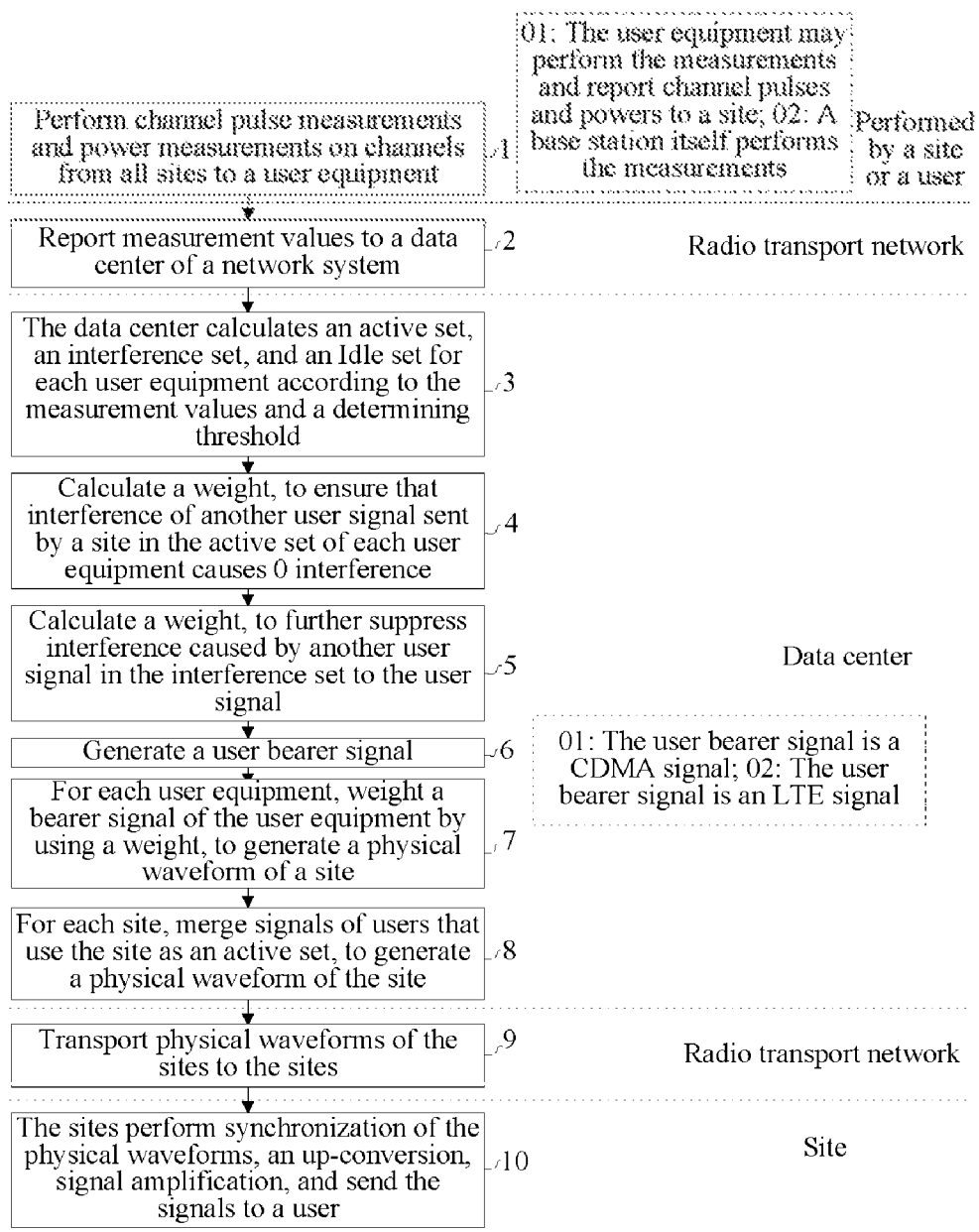
FIG. 5 is a schematic flowchart of signal processing performed by a signal processing system according to an embodiment of the present invention.

The following describes, by using an accompanying drawing, a specific process of signal processing performed by the system in this embodiment. FIG. 5 is a schematic flowchart of signal processing performed by the system in this embodiment of the present invention. As shown in FIG. 5, the process includes:

Step 1: Perform channel pulse measurements and power measurements on channels from all sites to a user equipment, where in method 1, the user equipment may perform the measurements and report channel pulses and powers to a site, and in method 2, a base station itself may perform the measurements.

Step 2: Report measurement values to a data center of a network system by using a radio transport network.

Step 3: The data center calculates an active set, an interference set, and an Idle set for each user equipment according to the foregoing measurement values and a determining threshold.

Step 4: The data center calculates a weight, to ensure that another user signal sent by a site in the active set of each user equipment causes 0 interference.

Step 5: The data center calculates a weight, to further suppress interference caused by another user signal in the interference set to the user signal.

Step 6: The data center generates a user bearer signal, where the bearer signal is, for example, a CDMA signal or an LTE signal.

Step 7: For each user equipment i, the data center weights a bearer signal of the user equipment by using a weight $w_{i,k}^r$, to generate a physical waveform of a site k.

Step 8: For each site, the data center merges signals of users that take the site as an active set, to generate a physical waveform of the site.

Step 9: The data center transports physical waveforms of the sites to the sites by using the radio transport network.

Step 10: The sites perform synchronization of the physical waveforms, an up-conversion, signal amplification, and send signals to a user.

Embodiments of the present invention further provide two system architectural diagrams, which are separately a network system architectural diagram of a data center for distributed signal processing and a network system architectural diagram of a data center for highly centralized signal processing.

Figure 6:
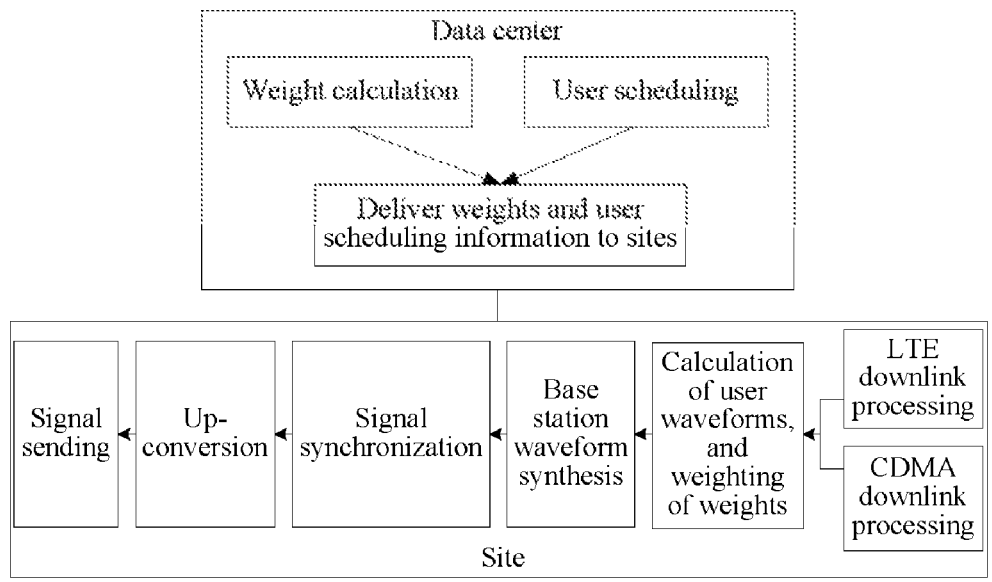
FIG. 6 is a network system architectural diagram of a data center for distributed signal processing according to an embodiment of the present invention.

FIG. 6 is a network system architectural diagram of a data center for distributed signal processing according to an embodiment of the present invention. As shown in FIG. 6, a site is further configured to: according to weighted values and user scheduling information that are sent by a data center server, perform calculation of user equipment waveforms and weighting of weights, and perform calculation of site waveforms, and send signals to user equipments according to the site waveforms, the user equipment waveforms, and the weighted values; that is, user data signal processing is partially shifted down to sites, and only weight calculation and user scheduling functions remain to be performed by the data center. For uplink processing, only the data center can perform global merging of user signals; the part of uplink weighting for a user equipment i on a site k is performed on the site, then the signals are uploaded to the data center, and the data center merges all data signals of the user equipment i, and then performs LTE or CDMA uplink processing.

However, in the system architecture shown in the foregoing FIG. 6, firstly, the part of user data signal processing is shifted down to the sites, and the wireless sites can acquire each user data signal, and therefore a problem of a security risk of the user data signal exists; and secondly, the part of the uplink weighting for the user equipment i on the site k is performed on the site, then the signals are uploaded to the data center, and the data center merges all data signals of the user equipment i, which increases the amount of data transported between the data center and the site, and wastes network bandwidth.

Figures 1, 7:
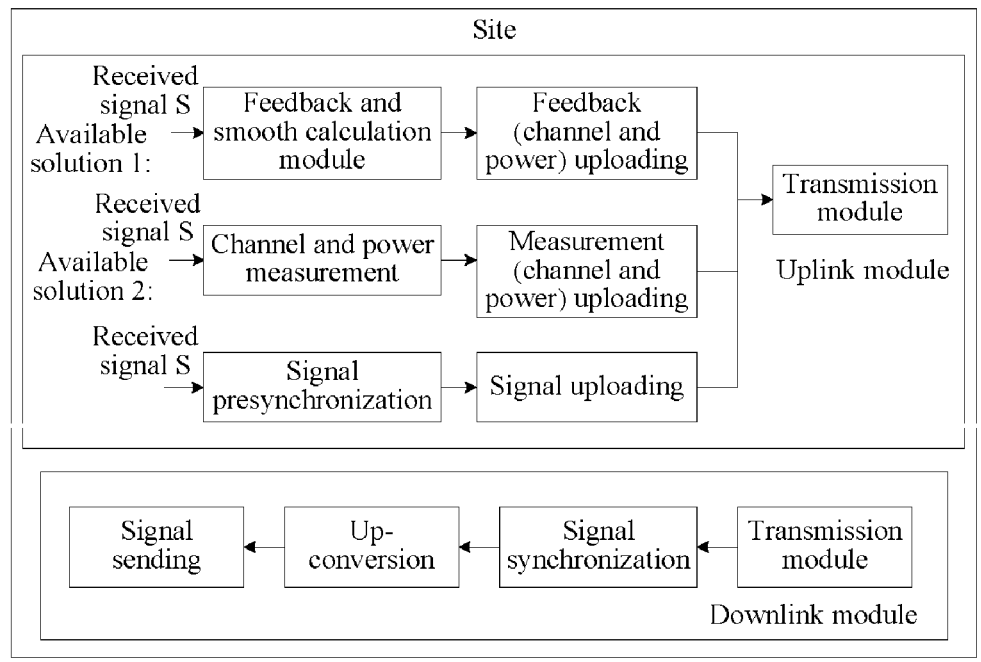
Figures 2, 7:
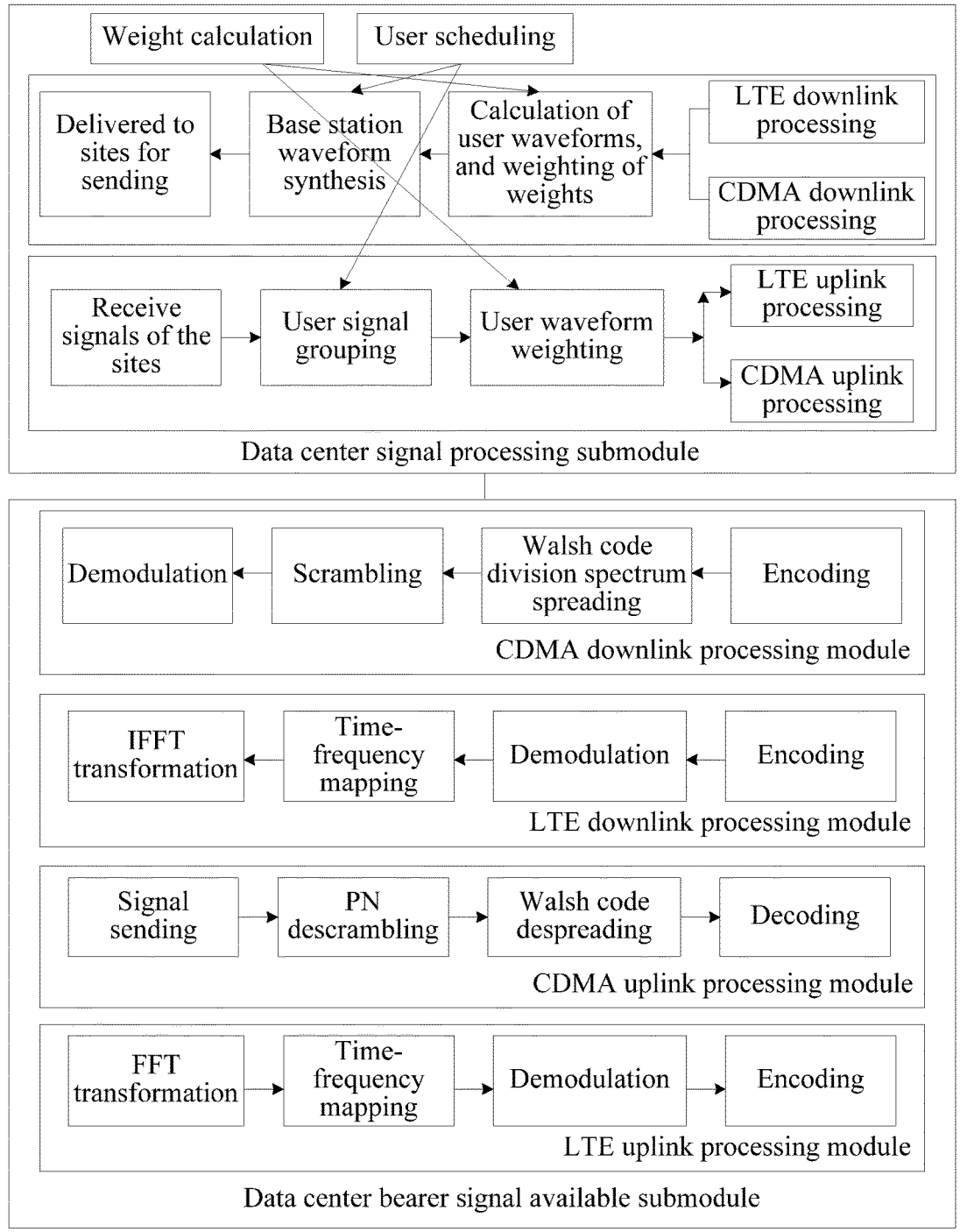

To solve the foregoing problems that exist in the system shown in FIG. 6, an embodiment of the present invention provides a network system architecture of a data center for highly centralized signal processing. FIG. 7-1 is a schematic diagram of a site operating principle in a network system architecture of a data center for highly centralized signal processing according to an embodiment of the present invention, and as shown in FIG. 7-1, functions of the site are to perform an up-conversion on a user data signal calculated by the data center, and then send the signal by using an antenna after sending the user data by using a radio frequency amplifier. In addition, the site is responsible for reporting channel and power values measured by a user equipment to the data center. For reception of a signal sent by a user equipment, after a down-conversion is performed, the data signal is directly delivered to the data center. The operations usually may be completed by a radio frequency unit, a digital unit, a clock unit, and a transmission unit in a site.

FIG. 7-2 is a schematic diagram of a data center operating principle in a network system architecture of a data center for highly centralized signal processing according to an embodiment of the present invention. The data center can execute the signal processing method in the foregoing embodiment shown in FIG. 1 or FIG. 2, and in an actual application, is a processing system architecture based on a software radio algorithm. For processing functions of the data center, refer to FIG. 7-2. Details are not provided again. It can be known from FIG. 7-2 that, the data center has calculated a user data signal sent by each site; and therefore firstly, user data signals transported between the data center and the site can be reduced, saving a network bandwidth, and secondly, only the data center can acquire a user data signal of each user equipment from the following sites, ensuring security of the user data signal.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a form of code in a computer-readable storage medium. The foregoing code is stored in a computer-readable storage medium, and includes several instructions for instructing a processor or a hardware circuit to perform some or all steps of the methods in the embodiments of the present invention. The foregoing storage medium includes: any medium that can store program code, such as a mobile storage disk that is equipped with a universal serial bus interface, is micro, has a high capacity, and does not need a physical drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present invention.

What is claimed is:

1. A signal processing method, comprising:

determining, for M user equipments, an active set $K_i$ and an interference set $K'_i$ of a user equipment i according to power measurement values from the user equipment i to N sites, wherein the active set $K_i$ of the user equipment i comprises an identifier $k_i$ of an active site that provides a wanted signal for the user equipment i, the interference set $K'_i$ of the user equipment i comprises an identifier $k'_i$ of an interfering site that provides an interfering signal for the user equipment, $k_i \in K_i$, $k'_i \in K'_i$, i=1, 2, . . . M, M is an integer greater than or equal to 1, and N is an integer greater than or equal to 1;

for the active set $K_i$ of the user equipment i, canceling signals sent by all other user equipments j of all active sites $k_i$ out with each other by superimposing the sent signals to obtain one constraint condition of a weight, and for the M user equipments, obtaining M constraint conditions, and determining a weight subspace T, wherein the weight subspace comprises M weights, j represents another user equipment in the M user equipments except the user equipment i, and j=1, 2, . . . M; j≠i;

determining each weight in the weight subspace according to an interfering signal of another user equipment j for the user equipment i in the interference set $K'_i$ of the user equipment i and a wanted signal of the user equipment i in the active set $K_i$ of the user equipment i, so that each active site in an active set of each user equipment determines one weighted value; and sending a signal from each active site to each user equipment using the corresponding determined weighted value at the same time and at the same frequency.

2. The method according to claim 1, wherein the determining, for M user equipments, an active set $K_i$ and an interference set $K'_i$ of a user equipment i according to power measurement values from the user equipment i to N sites comprises:

for the M user equipments, according to the power measurement values from the user equipment i to the N sites, if a power measurement value from the user equipment i to a site k is greater than or equal to a preset activation threshold value, determining the site k as an active site $k_i$ of the user equipment i, and adding the site k to the active set $K_i$ of the user equipment i, wherein k=1, 2, ..., N and $k_i$=1, 2, ..., N; or if a power measurement value from the user equipment i to a site k is less than a preset activation threshold value, and greater than or equal to a preset interference threshold value, determining the site k as an interfering site $k'_i$ of the user equipment i, and adding the site k to the interference set $K'_i$ of the user equipment i.

3. A signal processing method, comprising:

determining, for M user equipments, an active set $K_i$ and an interference set $K'_i$ of a user equipment i according to power measurement values from the user equipment i to N sites, wherein the active set $K_i$ of the user equipment i comprises an identifier $k_i$ of an active site that provides a wanted signal for the user equipment i, the interference set $K'_i$ of the user equipment i comprises an identifier $k'_i$ of an interfering site that provides an interfering signal for the user equipment $k_i \in K_i$, $k'_i \in K'_i$, i=1, 2, ..., M is an integer greater than or equal to 1, and N is an integer greater than or equal to 1;

for the active set $K_i$ of the user equipment i, canceling signals sent by all other user equipments j of all active sites $k_i$ out with each other by superimposing the sent signals to obtain one constraint condition of a weight, and for the M user equipments, obtaining M constraint conditions, and determining a weight subspace T, wherein the weight subspace comprises M weights, j represents another user equipment in the M user equipments except the user equipment i, and j=1, 2, ... M; j≠i;

determining each weight in the weight subspace according to an interfering signal of another user equipment j for the user equipment i in the interference set $K'_i$ of the user equipment i and a wanted signal of the user equipment i in the active set $K_i$ of the user equipment i, so that each active site in an active set of each user equipment determines one weighted value; and sending a signal from each active site to each user equipment using the corresponding determined weighted value at the same time and at the same frequency, wherein the constraint condition of the weight obtained by: for the active set $K_i$ of the user equipment i, making the superimposing of the signals sent by all other user equipments j of all the active sites $k_i$ cancelled out with each other is:

$$\text{s.t.} \sum_{j \neq i, k_i} \vec{h}_{i,k_i} A_{j,k_i} P_{j,k_i} \vec{w}_{j,k_i} A_{i,k_i} = 0,$$

wherein i=1, 2 ... M and j=1, 2, ... M; j≠i, i is an identifier of the user equipment i, and $k_i$ is an identifier of an active site in the active set of the user equipment i;

$$\vec{h}_{i,k_i}$$

is a channel measurement value from the user equipment i to the active site $k_i$;

$A_{j,k_i}$ is equal to 1 or 0, wherein when the active site $k_i$ of the user equipment i is an active site of another user equipment j, $A_{j,k_i}$ is equal to 1, and when the active site $k_i$ of the user equipment i is not an active site of another user equipment j, $A_{j,k_i}$ is equal to 0;

$P_{j,k_i}$ is a power measurement value from the user equipment j to the active site $k_i$ of the user equipment i;

$A_{i,k_i}$ is equal to 1 or 0, wherein when the site k is an active site of the user equipment i, $A_{i,k_i}$ is equal to 1, and when the site k is not an active site of the user equipment i, $A_{i,k_i}$ equal to 0; and $$\vec{w}_{j,k_i}$$

is a weight used by the active site $k_i$ of the user equipment i when sending a signal to the another user equipment j.

4. The method according to claim 3, wherein the determining each weight in the weight subspace according to an interfering signal of another user equipment j for the user equipment i in the interference set $K'_i$ of the user equipment i and a wanted signal of the user equipment i in the active set $K_i$ of the user equipment i comprises:

calculating the interfering signal of the another user equipment j for the user equipment i in the interference set $K'_i$ of the user equipment i:

$$I_i = \sum_{j \neq i, k'_i} \vec{h}_{i,k'_i} A_{j,k'_i} P_{j,k'_i} \vec{w}_{j,k'_i} I_{i,k'_i},$$

wherein $k'_i \in K'_i$;

calculating the wanted signal of the user equipment i in the active set of the user equipment i:

$$S_i = \sum_{k_i} A_{i,k_i} P_{i,k_i} \vec{h}_{i,k_i} \vec{w}_{i,k_i},$$

wherein $k_i \in K_i$; and determining target values of M maximum weights according to arg max$\|S_i\|^2/(\|I_i\|^2+N_i)$, calculating an average value of the target values of the M maximum weights, and using the average value as a weighted value used by the active site $k_i$, wherein $N_i$ is noise corresponding to the user equipment i.

5. The method according to claim 3, wherein the determining each weight in the weight subspace according to an interfering signal of another user equipment j for the user equipment i in the interference set $K'_i$ of the user equipment i and a wanted signal of the user equipment i in the active set $K_i$ of the user equipment i comprises:

calculating a power of the interfering signal of the another user equipment j for the user equipment i in the interference set $K'_i$ of the user equipment i:

$$\Delta_i = \|I_i\|^2 = \left\| \sum_{j \neq i, k'_i} \vec{h}_{i,k'_i} A_{j,k'_i} P_{j,k'_i} \vec{w}_{j,k'_i} I_{i,k'_i} \right\|^2,$$

wherein $k'_i \in K'_i$;

calculating a power of the wanted signal of the user equipment i in the active set of the user equipment:

$$\Gamma_i = \|S_i\|^2 = \left\| \sum_{k_i} P_{i,k_i} \vec{h}_{i,k_i} \vec{w}_{i,k_i} \right\|^2,$$

wherein $k_i \in K_i$; and in the weight subspace of the active site $k_i$, using weights corresponding to a minimum value of $\Delta_i$ and a maximum value of $\Gamma_i$ as weighted values used by the active site $k_i$.

6. The method according to claim 3, wherein the determining each weight in the weight subspace according to an interfering signal of another user equipment j for the user equipment i in the interference set $K'_i$ of the user equipment i and a wanted signal of the user equipment i in the active set $K_i$ of the user equipment i comprises:

calculating a power of the interfering signal of the another user equipment j for the user equipment i in the interference set $K'_i$ of the user equipment i:

$$\Delta_i = \|I_i\|^2 = \left\| \sum_{j \neq i, k'_i} \vec{h}_{i,k'_i} A_{j,k'_i} P_{j,k'_i} \vec{w}_{j,k'_i} I_{i,k'_i} \right\|^2,$$

wherein $k'_i \in K'_i$;

calculating a power of the wanted signal of the user equipment i in the active set of the user equipment i:

$$\Gamma_i = \|S_i\|^2 = \left\| \sum_{k_i} P_{i,k_i} \vec{h}_{i,k_i} \vec{w}_{i,k_i} \right\|^2,$$

wherein $k_i \in K_i$; and in the weight subspace, excluding one or more mutually orthogonal directions from a direction in which the power $\Delta_i$ of the interfering signal of the user equipment i increases, excluding one or more mutually orthogonal directions from a direction in which the power of the wanted signal of the user equipment i decreases, and using a weight corresponding to a final remaining direction as a weighted value used by the active site $k_i$.

7. The method according to claim 2, wherein:

adaptive adjustment is performed on the activation threshold value according to an activation threshold corresponding to a nominal power, based on an adjustment amount of a site transmit power, based on an adjustment amount of a user demodulation capability, based on an adjustment amount of a base station demodulation capability, and/or based on an adjustment amount of a bearer system; and adaptive adjustment is performed on the interference threshold value according to an interference threshold corresponding to the nominal power, based on the adjustment amount of the site transmit power, based on the adjustment amount of the user demodulation capability, based on the adjustment amount of the base station demodulation capability, and/or based on the adjustment amount of the bearer system.

8. The method according to claim 1, wherein after the determining each weighted value in a weight list of each active site in the active set of the user equipment i, and using the weighted value as a weight that a corresponding active site uses for sending a signal to the M user equipments, the method comprises:

sending the determined weighted value to the corresponding active site, so that the corresponding active site sends a signal to the M user equipments at the same time in a same frequency by using the determined weighted value.

9. A signal processing apparatus, comprising:
a memory; and
a processor coupled to the memory and configured to:
for M user equipments, determine an active set $K_i$ and an interference set $K'_i$ of a user equipment i according to power measurement values from the user equipment i to N sites, wherein the active set $K_i$ of the user equipment i comprises an identifier $k_i$ of an active site that provides a wanted signal for the user equipment i, the interference set $K'_i$ of the user equipment i comprises an identifier $k'_i$ of an interfering site that provides an interfering signal for the user equipment, $k_i \in K_i$, $k'_i \in K'_i$, i=1, 2, . . . , M, M is an integer greater than or equal to 1, and N is an integer greater than or equal to 1;

on the basis of the active set and the interference set, for the active set $K_i$ of the user equipment i, cancel signals sent by all other user equipments j of all active sites $k_j$ out with each other by superimposing the sent signals to obtain one constraint condition of a weight, and for the M user equipments, obtain M constraint conditions, and determine a weight subspace T, wherein the weight subspace comprises M weights, j represents another user equipment in the M user equipments except the user equipment i, and j=1, 2, . . . M; j≠i;

on the basis of the weight subspace, determine each weight in the weight subspace according to an interfering signal of another user equipment j for the user equipment i in the interference set $K'_i$ of the user equipment i and a wanted signal of the user equipment i in the active set $K_i$ of the user equipment i, so that each active site in an active set of each user equipment determines one weighted value; and send a signal from each active site to each user equipment using the corresponding determined weighted value at the same time and at the same frequency.

10. The apparatus according to claim 9, wherein the processor is further configured to:

for the M user equipments, according to the power measurement values from the user equipment i to the N sites, if a power measurement value from the user equipment i to a site k is greater than or equal to a preset activation threshold value, determine the site k as an active site $k_i$ of the user equipment i, and add the site k to the active set $K_i$ of the user equipment i, wherein k=1, 2, . . . , N and $k_i$=1, 2, . . . , N; or if a power measurement value from the user equipment i to a site k is less than a preset activation threshold value, and greater than or equal to a preset interference threshold value, determine the site k as an interfering site $k'_i$ of the user equipment i, and add the site k to the interference set $K'_i$ of the user equipment i.

11. The apparatus according to claim 9, wherein the constraint condition of the weight is:

$$\text{s.t.} \sum_{j \neq i, k_i} \overset{r}{h}_{i,k_i} A_{j,k_i} P_{j,k_i} \overset{r}{w}_{j,k_i} A_{i,k_i} = 0,$$

wherein i=1, 2 ... M, and j=1, 2, ... M; j≠i,
i is an identifier of the user equipment i, and $k_i$ is an identifier of an active site in the active set of the user equipment i;

$$\overset{r}{h}_{i,k_i}$$

is a channel measurement value from the user equipment i to the active site $k_i$;

$A_{j,k_i}$ is equal to 1 or 0, wherein when the active site $k_i$ of the user equipment i is an active site of another user equipment j, $A_{j,k_i}$ is equal to 1, and when the active site $k_i$ of the user equipment i is not an active site of another user equipment j, $A_{j,k_i}$ is equal to 0;

$P_{j,k_i}$ is a power measurement value from the user equipment j to the active site $k_i$ of the user equipment i;

$A_{i,k_i}$ is equal to 1 or 0, wherein when the site k is an active site of the user equipment i, $A_{i,k_i}$ is equal to 1, and when the site k is not an active site of the user equipment i, $A_{i,k_i}$ is equal to 0; and $$\overset{r}{w}_{j,k_i}$$

is a weight used by the active site $k_i$ of the user equipment i when sending a signal to the another user equipment j.

12. The apparatus according to claim 11, wherein the processor is further configured to:
calculate the interfering signal of the another user equipment j for the user equipment i in the interference set $K'_i$ of the user equipment i:

$$I_i = \sum_{j \neq i, k'_i} \overset{r}{h}_{i,k'_i} A_{j,k'_i} P_{j,k'_i} \overset{r}{w}_{j,k'_i} I_{i,k'_i},$$

wherein $k'_i \in K'_i$;
calculate the wanted signal of the user equipment i in the active set of the user equipment i:

$$S_i = \sum_{k_i} A_{i,k_i} P_{i,k_i} \overset{r}{h}_{i,k_i} \overset{r}{w}_{i,k_i},$$

wherein $k_i \in K_i$; and
determine target values of M maximum weights according to argmax$\|S_i\|^2/(\|I_i\|^2+N_i)$, calculate an average value of the target values of the M maximum weights, and use the average value as a weighted value used by the active site $k_i$, wherein $N_i$ is noise corresponding to the user equipment i.

13. The apparatus according to claim 11, wherein the processor is further configured to:
calculate a power of the interfering signal of the another user equipment j for the user equipment i in the interference set $K'_i$ of the user equipment i:

$$\Delta_i = \|I_i\|^2 = \left\| \sum_{j \neq i, k'_i} \overset{r}{h}_{i,k'_i} A_{j,k'_i} P_{j,k'_i} \overset{r}{w}_{j,k'_i} I_{i,k'_i} \right\|^2,$$

wherein $k'_i \in K'_i$;
calculate a power of the wanted signal of the user equipment i in the active set of the user equipment i:

$$\Gamma_i = \|S_i\|^2 = \left\| \sum_{k_i} P_{i,k_i} \overset{r}{h}_{i,k_i} \overset{r}{w}_{i,k_i} \right\|^2,$$

wherein $k_i \in K_i$; and
in the weight subspace of the active site $k_i$, use weights corresponding to a minimum value of $\Delta_i$ and a maximum value of $\Gamma_i$ as weighted values used by the active site $k_i$.

14. The apparatus according to claim 11, wherein the processor is further configured to:
calculate a power of the interfering signal of the another user equipment j for the user equipment i in the interference set $K'_i$ of the user equipment i:

$$\Delta_i = \|I_i\|^2 = \left\| \sum_{j \neq i, k'_i} \overset{r}{h}_{i,k'_i} A_{j,k'_i} P_{j,k'_i} \overset{r}{w}_{j,k'_i} I_{i,k'_i} \right\|^2,$$

wherein $k'_i \in K'_i$;
calculate a power of the wanted signal of the user equipment i in the active set of the user equipment i:

$$\Gamma_i = \|S_i\|^2 = \left\| \sum_{k_i} P_{i,k_i} \overset{r}{h}_{i,k_i} \overset{r}{w}_{i,k_i} \right\|^2,$$

wherein $k_i \in K_i$; and
in the weight subspace, exclude one or more mutually orthogonal directions from a direction in which the power $\Delta_i$ of the interfering signal of the user equipment i increases, exclude one or more mutually orthogonal from a direction $\Gamma_i$ in which the power of the wanted signal of the user equipment i decreases, and use a weight corresponding to a final remaining direction as a weighted value used by the active site $k_i$.

15. The apparatus according to claim 10, wherein the processor is further configured to:
perform adaptive adjustment on the activation threshold value according to an activation threshold corresponding to a nominal power, based on an adjustment amount of a site transmit power, based on an adjustment amount of a user demodulation capability, based on an adjustment amount of a base station demodulation capability, and/or based on an adjustment amount of a bearer system; and
perform adaptive adjustment on the interference threshold value according to an interference threshold corresponding to the nominal power, based on the adjustment amount of the site transmit power, based on the adjustment amount of the user demodulation capability, based on the adjustment amount of the base station demodulation capability, and/or based on the adjustment amount of the bearer system.

16. The apparatus according to claim 9, wherein the processor is further configured to send the weighted value to the corresponding active site, so that the corresponding active site sends a signal to the M user equipments at the same time in a same frequency by using the determined weighted value.

* * * * *